United States Patent [19]
He et al.

[11] Patent Number: 6,088,451
[45] Date of Patent: *Jul. 11, 2000

[54] SECURITY SYSTEM AND METHOD FOR NETWORK ELEMENT ACCESS

[75] Inventors: Jingsha He, Plano; Randle D. Hall, Corinth, both of Tex.

[73] Assignee: MCI Communications Corporation, Washington, D.C.

[*] Notice: This patent issued on a continued prosecution application filed under 37 CFR 1.53(d), and is subject to the twenty year patent term provisions of 35 U.S.C. 154(a)(2).

[21] Appl. No.: 08/674,638

[22] Filed: Jun. 28, 1996

[51] Int. Cl.$^7$ .................................................. H04K 1/00
[52] U.S. Cl. ........................... 380/25; 380/28; 395/200.57
[58] Field of Search ................... 380/28, 25, 9, 380/23; 395/200.47, 200.49, 200.55, 200.59, 187.01, 200.57, 739

[56] References Cited

U.S. PATENT DOCUMENTS

| | | | |
|---|---|---|---|
| 5,228,083 | 7/1993 | Lozowick et al. | 380/9 |
| 5,455,953 | 10/1995 | Russell | 395/739 |
| 5,495,533 | 2/1996 | Linehan et al. | 380/25 |
| 5,535,276 | 7/1996 | Ganesan | 380/25 |
| 5,590,199 | 12/1996 | Krajewski, Jr. et al. | 380/25 |
| 5,742,762 | 4/1998 | Scholl et al. | 395/200.57 |
| 5,764,887 | 6/1998 | Kells et al. | 395/23 |
| 5,815,574 | 9/1998 | Fortinsky | 380/25 |

OTHER PUBLICATIONS

Neuman, Clifford, Ts'o, Theodore, "Kerberos: An Authentication Service for Computer Networks", IEEE Communications Magazine, vol. 32, No. 9, pp. 33–38, Sep. 1994.

*Primary Examiner*—William Oen
*Assistant Examiner*—Robin Clark

[57] ABSTRACT

A system and method for securing access to network elements by user elements, wherein the network elements and the user elements are coupled to a network. A network security server coupled to the network, wherein the network security server provides network security mechanisms to control access to the network elements and protect network resources and information. The network security mechanisms include: an authentication server responsible for authentication of the network users to network elements, a credential server responsible for controlling the network user credentials or privileges, and a network element access server responsible for controlling of access to the network elements by the user elements. A registration database facilitates administration and management of access to the network by the user elements. The registration database stores user profiles and administrative information to enhance effectiveness of the network security mechanisms. Each of the user elements and the network elements includes a separate local access control means as an interface that is provided at each user element and operates in conjunction with the authentication server, the credential server, and the network element access server to facilitate secure communication of data over the network.

21 Claims, 9 Drawing Sheets

SECURITY SYSTEM AND METHOD FOR NETWORK ELEMENT ACCESS

BACKGROUND OF THE INVENTION

1. Field of the Invention

The present invention is directed to computer networks, and more particularly, to a system and method for security access to network elements.

2. Related Art

Network resources and information are a principle asset of modern companies and must be protected against unauthorized access for usage, disclosure, modification and destruction. Since these resources and information reside in various network elements such as switches, signaling transfer points (STPs), mainframe computers, database servers, etc., access to the network elements must be adequately controlled based on the security policy that accurately reflects business practice. The security mechanisms or measures that are implemented based on the security policy not only have to guard against threats from external attacks, but also have to control internal access to the network elements based on the principle of "need-to-know."

Network resources include hardware, software and data that are crucial to the continuation and success of businesses in the highly dynamic and competitive marketplace. Therefore, these resources and information must be properly and adequately protected against unauthorized usage, disclosure, modification and destruction.

Most of the current networks that connect users and network elements do not have the necessary security mechanisms to provide the adequate and desired protection to the network elements. Most of the protection measures currently available in large networks are offered by the individual network elements, and, therefore, are not effective and sufficient for the entire networking environment. They are not effective because security controls based on local network elements cannot provide the level of protection that are required for the entire network as a single entity. These security measures are not sufficient because security measures that are based on individual network elements are limited to the elements and cannot be easily extended to control user access that is beyond the scope of the control of the network elements. It is also very difficult to administer and manage the individual pieces of the network to achieve the effectiveness due to the existence of different types of network elements in the network, and due to the lack of a universal standard that guides the manufacturing of hardware and the implementation of software. This problem becomes more and more severe as the network grows larger and larger.

SUMMARY OF THE INVENTION

The present invention is directed to a security system and method for user access to network elements. This architecture provides the necessary security mechanisms that can effectively control access to network elements and, hence, protect network resources and information. It also supports the implementation of network-wide centralized user administration and management, authentication, credential/privilege control and access to individual network elements, which is highly desirable for a large and complex network. Combined with local access control mechanisms in the individual network elements, access to network resources and information can be adequately controlled from both local and remote user access.

The security system and method of the present invention support adequate security mechanisms to effectively protect network elements against unauthorized usage, disclosure, modification and destruction of network resources and information in these elements. The present invention provides security mechanisms that address the fundamental security concerns and problems that face large networks. It is also flexible and scaleable enough to accommodate future expansion as the result of business growth and expansion. The security architecture and method of the presented invention can meet both objectives.

The security system and method of the present invention provide security mechanisms using a network security server coupled to a network. The network security mechanisms include an authentication server, a credential server, and a network element access server. The method controls access to network elements by user elements and protects network resources and information. The method provides authentication of the network users to the network elements using the authentication server. Managing network user credentials or privileges is performed by the credential server, associated with the authentication server. Access to the network elements by the user elements is controlled by the network element access server, associated with the authentication server and the credential server. User profiles necessary for user authentificaton include, but are not limited to, a list of user credentials, user passwords and administrative information are stored in a registration database associated with the network security server, to facilitate administration and management of access to the network by the user elements. A separate local access control means is an interface that is provided at each user element and operates in conjunction with the authentication server, the credential server, and the network element access server to facilitate secure communication of data over the network between elements.

A general ticket is provided to each user element at log on to facilitate future access requests. The general ticket is presented to the network security server each time the user element initiates a communication session. The general ticket is used by the network security server to authenticate access requests without having to verify user credentials for each access request. If upon initiation of a communication session the general ticket is authenticated, the network security server generates a session ticket and provides the user element with the session ticket and a unique session encryption key. The session ticket is used by the user element to communicate with the selected network element.

The session ticket includes a unique session encryption key to be used by the user element for encrypting data for communication to the network element and by the network element for decrypting that data. The session ticket itself is encrypted using the a key derived from the password of the selected network element so that only the selected network element can verify the session ticket and successfully retrieve the session encryption key.

The user element first encrypts the data to be communicated to the network element using the unique session key and then sends the encrypted data and the session ticket to the network element. Upon receipt of the session ticket and encrypted data, the network element attempts to decrypts the session ticket using its own password as a key. A valid ticket is one that can be decrypted so as to yield the unique session key for decryption of the data. If the session ticket is valid, the selected network element decrypts the data using the unique session key and acts upon user request.

The encryption and decryption can be performed by the local access control means associated with the requesting element and the selected element. Integrity checksums can also verify communications between the requesting element and the selected element.

The network can be logically partitioned to create at least two separate realms. Each realm is provided with its own network security server and an inter-realm authentication means for communication with another of the at least two separate realms. The realms can share the registration database.

Additionally, the network can be coupled to a dial-up server to permit dial-up users access the network elements through the same network. The dial-up server supports a network communication protocol to connect the dial-up users to the network and a dial-up access protocol to connect the dial-up users to a dial-up access network.

BRIEF DESCRIPTION OF THE FIGURES

The present invention will be described with reference to the accompanying drawings, wherein.

The preferred embodiment of the invention is described below with reference to these figures where like reference numbers indicate identical or functionally similar elements. Also in the figures, the leftmost digit of each reference number corresponds to the figure in which the reference number is first used.

DETAILED DESCRIPTION OF THE PREFERRED EMBODIMENTS

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the invention.

1. Network Security Issues

This section provides an overview of network environment, security concerns and problems, and general mechanisms that address the concerns and solve the problems.

1.1 User and Network Elements

A network consists of a collection of individual systems, primarily network elements and user elements, and a communication network. This communication network interconnects these elements together to form a network of systems that carry out specified functions and offer desired services to users. Network elements are usually considered to be those individual systems that provide the ultimate services to users or customers that lead to access to valuable system resources and information in the elements, while user elements are primarily a user interface to the network and used for access and unload of network resources and information. The communication sub-system that interconnects the user and network elements together are usually transparent to the users of the network resources and information. Therefore, a network can be interpreted rather differently depending on who the users are and what the network elements are. For example, regular users of an electronic mail service may not be aware of the existence of the routers in the network that are needed to route the mail traffic, nor do they care about their existence as long as the electronic mail can be correctly delivered as required and specified. On the other hand, network systems administrators have to deal with the configuration and management of routers to ensure seamless flow of network traffic. Therefore, to network systems administrators, routers are also network elements that need to be properly maintained.

Figure 1:
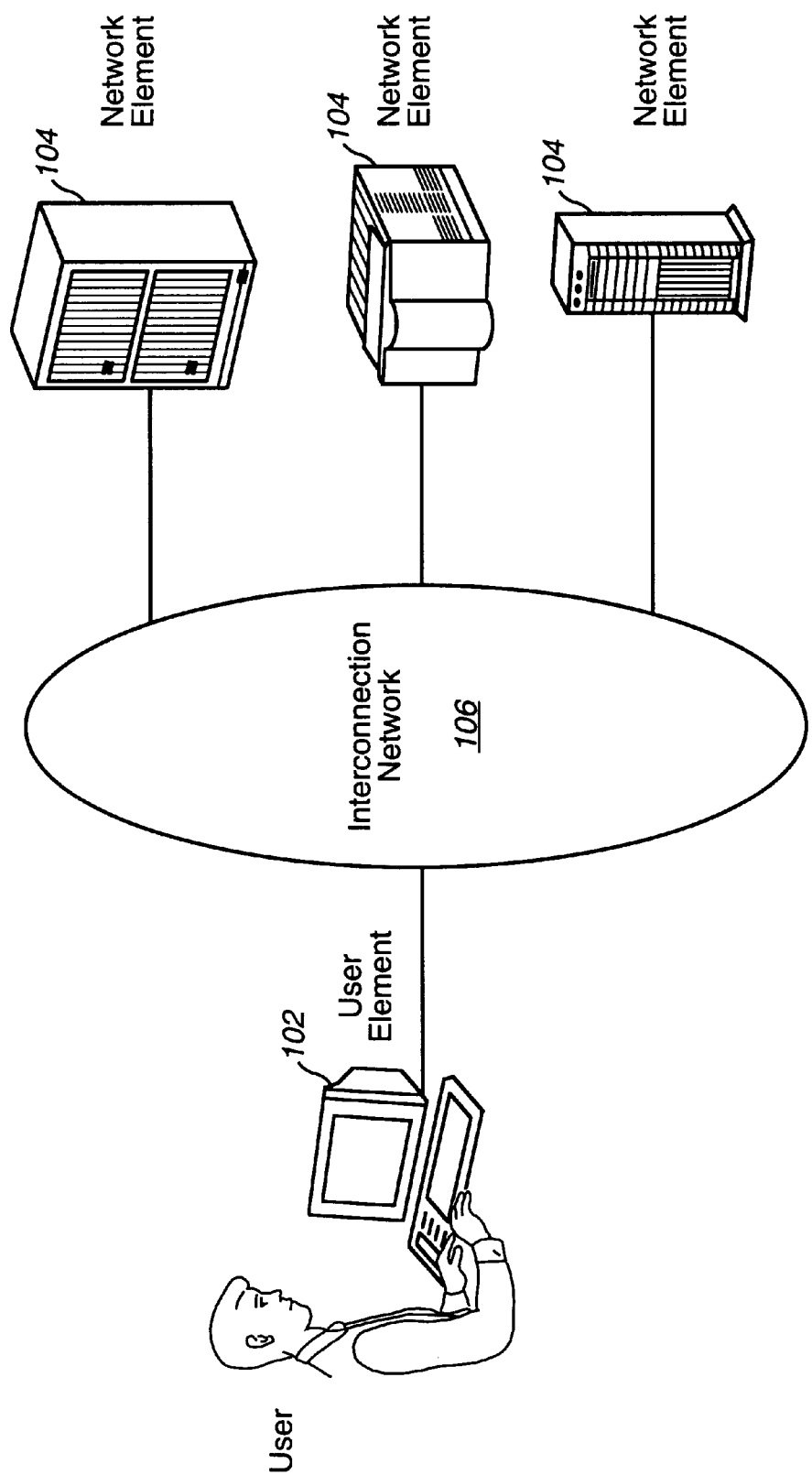
FIG. 1 illustrates a high-level block diagram of a conventional network.

As the result, in the abstraction of a networking environment, a network of individual systems can be modeled as being comprised of user elements 102, network elements 104, and the interconnection network 106, as shown in FIG. 1.

In the network of FIG. 1, a user element is a local system accessible to the user in order for the user to access network resources and information that reside in the network elements. This abstracted network model allows the addressing of security concerns separately for the user elements and for the network elements although there might have some common concerns. It also helps focus on the network elements as the primary subject of discussion for security protection against unauthorized usage, disclosure, modification and destruction of network resources and information. In the case that a network element 104 is also a user element 102 to allow local user access, this abstraction requires the separation of the two logical functions, i.e., network service function and the user interface function. This separation does not have to be physical, however, but only indicates different functionality in the same network element. Eventually, the integration of local access control (described below) and remote network access control will make this distinction less meaningful, which is the ultimate goal of controlling access to the network elements.

1.2. Enterprise Network

A network for a business enterprise connects various network elements and employee office personal computers together. Network elements connected to the network can include switches, signaling transfer points (STPs), data access points (DAPs), mainframe computers, etc., that represent essential resources and information to conduct and succeed in business. A user is allowed to access a network element from a personal computer provided that the user has been granted the access right. To the user, the network is transparent in the sense that there is no need for the user to understand its internal structure, e.g., the way in which data packets are routed. All it needs for the user to access the network elements is a protocol for the personal computer and a network element to communicate with each other. It does not make any difference whether the protocol is based on dial-up access or one that runs at a higher level in the protocol stack.

1.3. Network Security Concerns

The central theme around security of network elements is how user access can be appropriately and effectively controlled for access to network elements. Total blocking of access to network elements, while ensuring total and absolute security, does not serve the purpose of resource and information sharing between users and systems and that of remote system maintenance and administration. At the other extreme, access without any control exposes the network elements to a great danger of undesirable consequences of network resource and information misuse and abuse and subjects the network elements to malicious attacks that could result in the disclosure of sensitive information and the destruction of information integrity. Proper access control, hence, is the key to a satisfactory solution for network security for protecting access to network resources and information.

Many networks are exposed to security threats from both internal and external access. The security concerns and problems for network elements and for user elements are different, however, although they may share some common properties. These concerns and problems are particular to the environment of internetworking and shall not be mixed up with local security issues. Nevertheless, local security in network elements is very important and shall be an integral and indispensable part in the overall solution towards a secure environment, according to the preferred embodiment of the present invention. Local security ensures that proper access control exists for local user access requests without requiring any connection through the interconnection network. The ultimate objective of security for network elements, however, is to integrate local access control mechanisms with network access control mechanisms.

1.3.1. Security Concerns

Security concerns resulting from threats from internal and external sources to network elements can be classified into three types: secrecy, integrity and denial of service.

Secrecy addresses the concern for confidentiality of network resources and information. It rests on the assumption that the disclosure of sensitive information to unauthorized users may lead to undesirable consequences to another user or business enterprise due to its valuable nature in business markets, in national defense or in personal privacy. Consequently, this information cannot be disclosed to anyone who requests it. It may also be at the owner's discretion to limit its disclosure to a selected group of users rather than the entire user community. In a word, the source of secrecy requirements may be due to a particular network environment or due to the desire of the owner of the network resources and information to limit user access to them. Therefore, the particular secrecy requirements that have to be met in the network to satisfy the request to secure and protect network resources and information need to addressed.

Integrity addresses the concern for unauthorized modification and destruction of network resources and information. It rests on the assumption that the alteration of certain information may lead to some undesirable consequences to a user or a company due to the nature of the information content. Similar to the secrecy concern, integrity requirements originate from the users and shall be an indispensable part in the overall security solution to protect network resources and information.

Denial of service addresses the concern for unauthorized disruption of the continuous availability of network resources and information to authorized users. It rests on the assumption that the disruption of the availability of certain network resources and information may lead to some undesirable consequences to a user or a company due to the requirement for continuous services. It should be noted that a high level of reliability does not automatically lead to a high degree of availability. Reliability is only a necessary requirement for availability and should be addressed as an integral part of availability requirements that deal with the denial of service problem.

Although the concerns about the secrecy, the integrity and the denial of service of network resources and information are the primary issues and challenges faced every day, the individual users will have their priorities of the various security issues. Similarly, network elements that offer user services to access network resources and information may have a different set of security issues that are different from user elements that directly connect the users to the network. Therefore, some of these distinguishing issues need to be clearly identified.

1.3.2. Network Elements

Network elements provide valuable network resources and information to legitimate users. They are also the targets of malicious activities from internal and external threats for the unauthorized usage, disclosure, modification and destruction of these network resources and information. Therefore, access to network elements must be properly screened to prevent, to limit and to detect illegitimate activities. Some of the security concerns for network elements are listed as follows:

(1) This concern is about whether a user who wishes to access network resources and information in a network element is a legitimate user. The problem is how to establish and identify the legitimacy of a user.

(2) This concern is about whether a legitimate user who wishes to access network resources and information in a network element is really the user as claimed. The problem is how to effectively validate the identity of a claimed user.

(3) This concern is about whether a legitimate user who wishes to access network resources and information in a network element possesses and would correctly present the user credentials, whether intentionally or unintentionally, to gain unauthorized access to the resources and information. The problem is how to grant a user with proper and right user credentials.

(4) This concern is about whether a legitimate and authorized user who wishes to access network resources and information in a network element would perform some activities to the resources and information that the user is not supposed to do. The problem is how to control access to resources and information based on discrimination access policy against different users on the basis of their "need-to-know."

(5) This concern is about whether the attempt to access network resources and information in a network element by unauthorized users can be detected. The problem is how to detect such attempts and activities.

(6) This concern is about whether the content of information exchanged between the network element and the authorized user can be protected from malicious attempts leading to the usage, disclosure, modification and destruction of the information. The problem is how to protect the content of information that flows outside of the control of the network elements.

These are major security concerns to network elements and have to be addressed in any plans or proposals towards a comprehensive solution for the protection of network resources and information in these elements.

1.3.3. User Elements

Although user elements are defined in the above abstraction of network model as being the interface to users for access to network resources and information, their role in the overall solution for the protection of network resources and information cannot be underestimated. This is because the interaction between the user and a network element inevitably exposes the involved network element to a certain degree of security risks. Therefore, security concerns for user elements must also be addressed in the comprehensive solution for the protection of network resources and information. Some of the security issues that concern user elements are as follows:

(1) This concern is about whether the user is really using the genuine local service to interface and to communicate with network elements. The problem is how to prevent malicious attempts to obtain the essential information about the user to access the network elements using the local user elements.

(2) This concern is about whether the user is communicating with the right network elements as desired and requested. The problem is how to ensure the user that information is exchanged with the correct network elements.

(3) This concern is about whether information retrieved from a network element can be properly protected at the user element. The problem is how to establish proper local security policy on the user element to prevent unauthorized disclosure of information obtained from network elements.

(4) This concern is about whether the content of information exchanged between a network element and an authorized user can be properly protected from unauthorized disclosure and modification. The problem is how to protect the content of information that flows outside of the control of the network elements and the user elements.

1.3.4. Interconnection Network

The security of the interconnection network that enables users to access network resources and information in the network elements shall never be automatically assumed in any comprehensive solution to the protection of network resources and information. This is simply because it is impossible to physically secure each and every single link of the network. Therefore, no security solution shall ever rest its effectiveness on the security of the interconnection network. In addition, no attempts to secure the interconnection network shall ever be pursued, for they are never be achievable except in very few isolated instances where the interconnection network can be physically constrained in an area where physical security can be assured. This is definitely not the situation for many large enterprise networks.

1.4. Security Mechanisms

A variety of security mechanisms can be devised to address the network security concerns discussed above for network elements and for users. Following are the mechanisms employed to address the security of access to network elements concerns and solve the security problems in networking environments. Integrated together, these mechanisms provide a comprehensive network security solution that can effectively protect network resources and information in accordance with the present invention.

The basic security assumption in the protection of network resources and information shall be that no user shall be trusted unless it can be proved. Furthermore, even the access from trusted users must be controlled to those network resources and information that are allowed to the users. In addition, actual access decisions must be based on the rule of fail-safe. That is, unless authorized and allowed explicitly, no user access is presumably and automatically granted.

There are various levels of trust that need to be established before access control to specified network resources and information can be made effective. The following mechanisms can be used to achieve the goal of establishing the various levels of trust. These mechanisms will be further elaborated on in the next section.

1.4.1. User Identification

User identification provides the necessary means for the identification of legitimate users from each other. It is based on the desire and requirement that user access to network resources and information be limited to only a selected group of people and that the control system be able to discriminate on the different users who are allowed the access to perform different tasks or to access different information.

User identification is accomplished through the assignment of a unique system-wide identifier to each and every legitimate user and the establishment of a user registration database to facilitate the administration and management of the user identifiers along with other necessary user account information. User identification is the basic requirement for all other network security protection mechanisms because it provides the set of subjects in the control of access to network resources and information.

User identification shall be equally applied to network elements as well for the identification of network resources and information to be accessed by users and for the establishment of trust relationships between the users and the network elements.

1.4.2. User Authentication

User authentication provides the necessary means for the validation of the identity of a legitimate user. It prevents malicious attempts that pretend as legitimate users in order to access network resources and information. It is based on the desire and requirement that forgery of user identification information be properly prevented and detected.

User authentication is accomplished through the establishment of the so-called "secret password" for each user identifier. (The term "secret password," however, has many synonyms, such as secret key, private key, private password, or the like. It is more accurate, and worth noting, that the word "password" connotes the human readable form of a "secret password," and the word "key" refers to a computer readable form, internal representation or mapping of the "password." The password is a piece of secret information that shall be known only to the legitimate user and, therefore, must be properly protected against any malicious attempts to disclose it to other legitimate or illegitimate users. The key is a useful form of the password for encryption and decryption of data.) User authentication is very important because it is relied upon for the establishment of trust between network elements and users for access to network resources and information and for the exchange of information between them.

User authentication shall be a two-way process. Not only does it authenticate a user to a network element, but it also authenticates the network element to the user. That is, it helps the establishment of mutual trust relationships between a user and a network element.

1.4.3. User Credential/Privilege Control

User credential/privilege control provides the necessary means for the correct establishment of user credentials based on which user privilege regarding the access to network resources and information can be appropriately determined. It prevents legitimate and authorized users from lying about their credentials in order to gain access to network resources and information which otherwise would not be allowed. It is based on the desire and requirement that user access to network resources and information be accurately controlled against the correctly presented credentials of the users. User credential control is part of the access mechanism that supports and implements the principle of "need-to-know."

User credential/privilege control is accomplished through the establishment of a credential granting authority to manage and control the assignment of proper credentials to user accounts. The assignment of such credentials to a user must be based on the principle of "need-to-know" and must be properly adjusted when the role of the user in the network is changed with respect to access to network resources and information.

User credential checks are performed against all users before or during final access control decisions are made with regard to which network resources and information can be accessed and what kind of access can be performed. It is the next level of control to the authentication mechanism that establishes the legitimacy and authorization of the users.

1.4.4. User Access Authorization

User access authorization provides the necessary means for the control of actual user access to network resources and information. It is based on the desire and requirement that user access to network resources and information be further discriminated with regard to what actual access operations can be applied by legitimate users to them beyond user identification and authentication. It prevents authenticated users from accessing the network resources and information they are not supposed to and from abusing the right to access those they are allowed to. It also protects network resources and information from being maliciously damaged.

User access authorization is accomplished through the establishment of an access control list for each network resource or information. This list shall contain the list of user identifiers who are allowed to access it and the kind of access rights that are allowed to each user. The access control list can also be established based on user identities that specifies the list of network resources and information the user is allowed to access along with the exact access rights or the kind of operations the user is allowed to performed on the network resources and information.

User access authorization and control must be performed for each and every individual user request to access network resources and information. The access decision shall be based on the presentation of the identity and credentials of the user, the network resource or information that the request is destined, and the kind of access the user request desires. The decision shall also be based on an access check procedure against the access control list for the network resource or information or for the user. User authorization is the final access control mechanism to distinguish users between different types of access to network resources and information beyond authentication and user credential/privilege control. On the other hand, it relies on the effectiveness of authentication and user credential/privilege control to achieve its objectives.

1.4.5. Encryption and Decryption

Encryption and decryption provides the necessary means for the protection of network information from being disclosed to those users who are not authorized to receive and retrieve it. It can be used as a supplement to access control mechanisms against unauthorized information disclosure but is primarily used for conducting secure communications between users and network elements in a networking environment. Encryption and decryption is also crucial for the implementation and effectiveness of some of the other access control mechanisms that are described above.

Encryption and decryption is accomplished through the use of an encryption algorithm or process and a decryption algorithm or process that reverse or complement each other's result. The encryption process usually applies a unique key to the information and translates it into a form that is incomprehensible, hence called the cipher text. The decryption process then needs to apply the same or a different unique key to reverse the encryption process to turn the cipher text information back into its original form of representation. The ability to retrieve the content of the information, therefore, relies on the possession of the correct key to decrypt the cipher text.

1.4.6. Integrity Checksum

Integrity checksum provides the necessary means for the protection of information from being accidentally or maliciously changed which results in the loss or misrepresentation of information. It can be used as a supplement to access control mechanisms against unauthorized information modification but is primarily used for ensuring correct communications between users and network elements in a networking environment. Integrity checksum is also crucial for the implementation and effectiveness of some of the access control mechanisms that are described above.

Integrity checksum is accomplished through the application of a formula that computes the checksum of the information that needs to be protected. The checksum will then be included in the body of a message along with the information to be exchanged. The recipient of the message verifies the correctness of the information by regenerating a checksum based on the information received and comparing it with the one computed based on the original information. The formula for the computation of the checksum possesses the characteristics that any changes to the content of the information shall lead to different checksum values. There are some additional criteria that characterize the level of sophistication of the checksum formula, such as the maximum number of changes to the information units that can be detected based on the checksum and whether the checksum formula has the potential to be used for indicating and correcting the errors in the information content. This characterization of integrity checksum is beyond the scope of this disclosure, however.

1.4.7. Security Auditing

Security auditing provides the necessary means for the detection of malicious attempts to circumvent the security mechanisms in order to obtain unauthorized access to network resources and information. It also helps in the discovery and correction of network system and security flaws due to poor security policy and/or implementation limitations and mistakes. Security auditing is especially important in the networking environment because previous auditing mechanisms for local system activities are not sufficient to provide the necessary information for network access to resources and information.

Security auditing is accomplished through the continuous execution of a real-time software process that logs specified on-going system and network activities into an audit trail based on well-defined user identities or network system events. An audit trail record typically contains the user identifier, the name of the network resource or information, the access request, the access decision, the result of the access to the resource or information, and the time of the access request, among others. Security auditing shall be dynamically configurable based on the user identifiers and/or the system events that wish to be audited. Auditing records shall then be examined manually, visually or automatically to detect suspicious activities and then to initiate corrective actions to respond to these activities.

2. Network Security Architecture

Network security architecture for the protection of network elements according to the present invention is presented in this section, which includes: (1) to present the structure and describe the components in the architecture, (2) to show how the various security mechanisms are provided and supported in the architecture, and (3) to discuss system integration issues that achieve the effectiveness of network access control to network resources and information.

2.1. Network Security Structure

Figure 2:
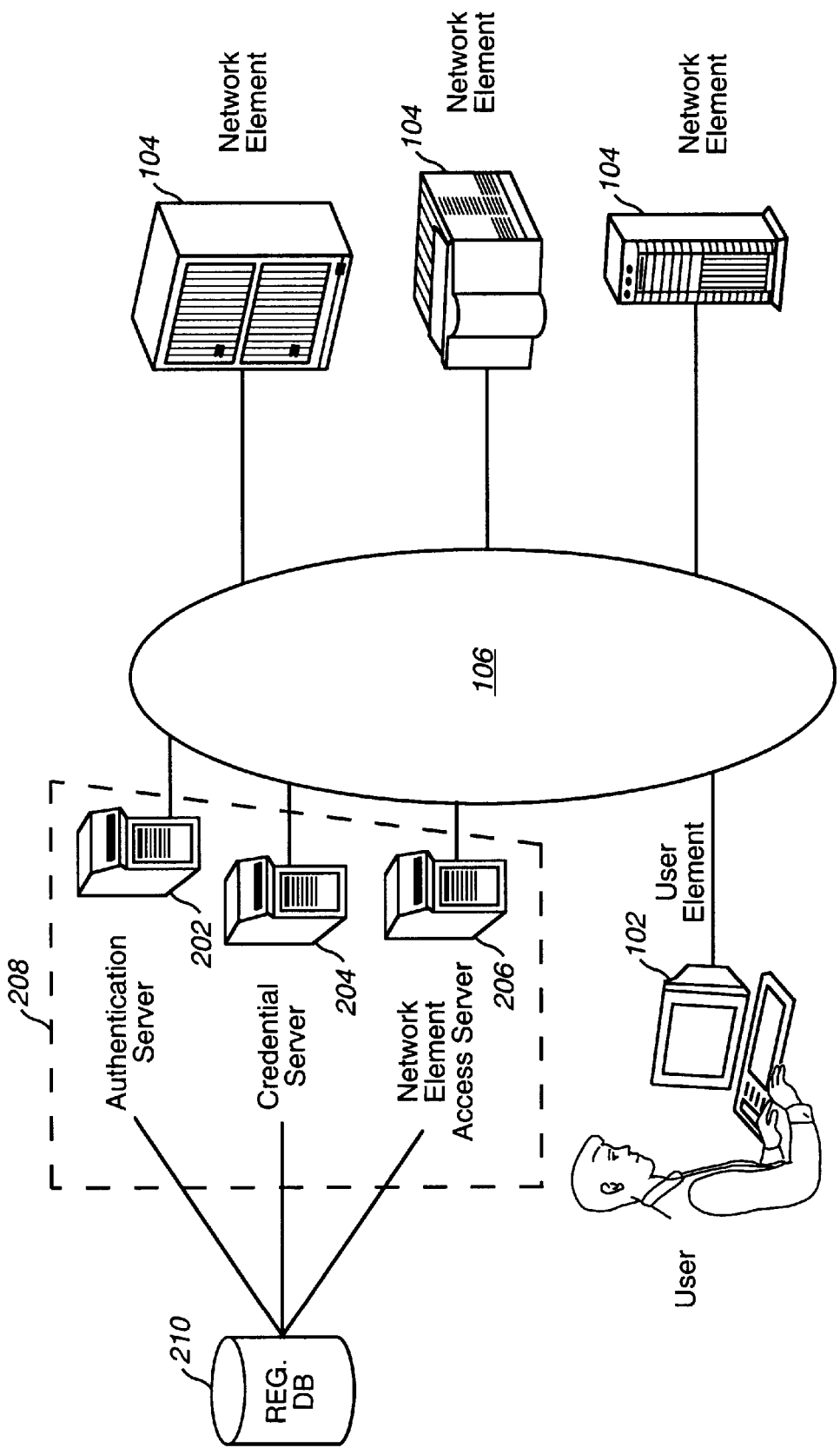
FIG. 2 illustrates a high-level block diagram of a network including a network security server 208 in connection with the present invention.

The network system security structure according to the present invention is depicted in FIG. 2. It can be seen that this security structure is built upon the network abstraction of FIG. 1. Consequently, this security structure does not require any significant changes to the original hardware configuration. This minimizes the impact of network security implementation on current network system operations. The security mechanisms that are supported can rely solely on the add-on network components to be described below and some basic required software upgrades in the network and user elements. For performance reasons, however, it may be desirable that some of the essential security mechanisms be implemented in hardware or firmware. The practical value of such an option is invisible at this moment and, hence, is beyond the scope of this disclosure.

2.2. Components and Interconnection

Three components in FIG. 2. for providing network security solutions include a network authentication 202, user credential control 204 and network element access control 206, are described in this section along with the interconnection requirements. Collectively, these three components are generally referred to as a network security server (NSS; also called the master server), as shown at dashed box 208. In the discussion of each component, the role that the component plays will be described. The issue of connecting the network security server into the network as well as those of network partition and reliability for the purpose of enhancing network user administration, management and control will then be discussed.

The term server is used herein to indicate separate functionality, not necessarily separate structure since aspects of the present invention can be implemented in software. This is the case since functionality performed by a single software routine or program can readily be separated and performed by multiple software routines or programs.

2.2.1. Authentication Server

The authentication server 202 is responsible for the authentication of network users to network elements, and vice versa. First, this is necessary because user element 102 and network element 104 are suspicious of each other. To a network element, the suspicion is based on the fear that the user identity may be used by an unauthorized user for access to network resources and information in the element. Since it is illegal by its nature, such an access exposes the network element to a great danger that the involved network resources and information may be maliciously disclosed, modified or destroyed which could lead to serious security consequences in the secrecy, integrity and denial of service of the resources and information to authorized users. To an authorized user, on the other hand, the suspicion is based on the fear that the network element is a malicious fake that attempts to collect user information through an engaged dialogue with the user. The ultimate goal of such malicious activities, however, is to get the important information about legitimate users in order for the unauthorized users to access network elements by using the collected necessary and legitimate user information. To simultaneously satisfy both the needs of the users and those of the network elements to authenticate each other, a separate service that is trusted by both the users and the network elements is needed to perform network authentication to establish the mutual trust between them. The authentication server 202 fulfills this requirement. That is, it is trusted by every user and network element 104 throughout the network and its mission is to help establish mutual trust between a user and a network element.

Second, although network elements may already have some authentication mechanisms in them to control and authenticate user log-in requests, they are generally inadequate and insufficient for controlling remote user access in a networking environment. This is because the need to perform authentication at the network elements 104 themselves would require that a user secret password be transmitted over the open communication network from the user to the network elements. Since it is impossible to physically secure the open network, which is a basic assumption about the network, secret user information such as the password shall never be allowed to flow in the network, whether the information is in a clear text form or it has been manipulated to prevent the disclosure of its original content. Current network element based authentication cannot meet this requirement without the introduction of the network authentication server.

Third, in a networking environment, network resources and information are distributed in different network elements. Users may be authorized to access these resources and information across the different elements. As more and more users are allowed the access and more and more network resources and information are made available for user access, the administration and management of user accounts becomes a greater and greater burden. Not only does it become more difficult to manage more network elements and more user accounts, but also the requirement to manage a single user account and to synchronize the account in all the network elements becomes an increasingly great administrative and managerial task that cannot be under-estimated. On the other hand, this task is essential to maintain the effectiveness of all network access mechanisms to control user access to network resources and information. The centralized authentication service relieves this administrative burden because it is designated as the sole place where essential user network authentication information is stored for the entire network 106. All user account information will then be stored in a database and managed exclusively at the site of the authentication server 202.

From the discussion above, the introduction of the authentication server not only solves the network authentication problem, but also relieves the administrative burden of user account administration and management through the centralization of the administration and management to the server. The latter is especially important in a large enterprise networks for it provides a long-term solution to the problem of network authentication and, at the same time, provides a means to maintain the effectiveness of the solution.

2.2.2. Credential Server

The credential server 204 is responsible for controlling network user credentials or privileges, which is essential for effective network access control. In addition, the credential server 204 provides the means for the central administration and management of user credentials for effective and efficient administration, the same as the authentication server 202.

The authentication server 202 only authenticates the user identity to network elements. However, the ultimate access decision may also depend on some user account information other than merely the user identity. Thus, it is necessary to implement this extra level of control on the essential user account information, called user credentials, for effective access control to network resources and information. This control is based on the suspicion that authenticated users may not be honest about their personal credentials in order to gain access to network resources and information that otherwise would not be allowed to them. User credential/privilege control is an integral part of the user sign-on process that leads to the final access decisions to grant or to deny user access requests for network resources and information.

Centralized user credential/privilege control also relieves the administrative burden to effectively and efficiently control and manage user credentials. As all user credentials are derived from and certified by the credential server 204, any changes to user credentials can be immediately made available to the entire network. This greatly helps user credential management and administration and, at the same time, significantly enhances the effectiveness of the access control mechanisms.

The user credentials for a user may be determined in a variety of ways. They may be established based on criteria that are related to the past history of the user regarding the behaviors of access to network resources and information. They may also be established based on the current obligations or roles the user plays in the network. For example, the organization that consists of a department number and a location code can reflect the current responsibility the users have in their job and, therefore, can be used as the user credentials to determine the access rights for the users to access network elements. Other user credentials can be similarly identified and used for the access control purposes that help enforce the principle of "need-to-know."

2.2.3. Network Element Access Server

Network authentication and credential control are applicable to all network elements. That is, regardless of how many network elements that are desired to be accessed, authentication and credential certification shall always be performed. After sign-on to the network, a user may wish to access a specified number of network elements, however. The control of access by the user to these elements is then the responsibility of the network element access server 206.

To gain the right to access a network element, the user communicates with the network element access server 206 to specify the name of the network element 104. Upon receiving the access request, the network element access server 206 will check an internal access matrix to determine whether the user is allowed any access at all to the specified network element 104. If the check is successful, the network element access server will issue a certificate or ticket to the user. The ticket is the necessary piece of information that has to be presented in all communication between the user and the network element 104 for access to any resources and information in the element.

The introduction of the centralized network element access server 206 also serves to consolidate the administration and management of element-level access control from users to network elements. Consequently, costly and lengthy administration, management and synchronization of such access control in individual network elements can be avoided. Same as the authentication server 202 and the credential server 204, this component 206 not only serves its distinctive and unique functions in the access control to network elements, but also greatly enhances the effectiveness and efficiency of user and system administration and management.

2.2.4. Interconnection

As described above, the three components, i.e., the authentication server 202, the credential server 204 and the network element access server 206, together control every user access to the network elements. Further access control to network resources and information in these elements shall be subject to access control mechanisms in the individual elements, which will be discussed in the next section.

The only requirement for the three network security servers to be connected into the interconnection network 106 is that proper protocols be supported to facilitate communications to the user elements and to the network elements. The interconnection of user elements, network elements and the three network security servers make the servers indistinguishable to the other elements except that they function differently. Therefore, for ease of description, they are simply referred to hereafter to as server elements. If this interconnection requirement cannot be met, a front-end processor must be built for some or all of the individual elements to facilitate such a communication. This implies that a common communication protocol is the minimum that is required for the interconnection of the user, the network and the server elements, as would be apparent to a person skilled in the relevant art.

The distinction between the three server elements, i.e., the authentication server, the credential server and the network element access server, is purely logical. Their functionality are typically implemented in different software modules. Nevertheless, it is not uncommon to find that all the modules coexist and execute on the same hardware platform. Therefore, the server element interconnection to the network may be realized by only one physical connection between the server hardware platform and the interconnection network. This is, however, an implementation detail which would not in any way affect the overall architecture and operation of the network security services and is, therefore, beyond the scope of this discussion.

2.2.5. Network Partitioning

In a large network, it may be desirable to logically divide the different types of network elements into different classes and logically partition the interconnection network 106 into sub-networks for administrative purposes. For example, all switches can be logically or all switches of the same type are bundled together to form a sub-network, so are all STPs and DAPs, etc. The partitioning of network elements is purely logical and for the administrative purposes and would by no means require any change to the physical structure of the network. This is especially desirable if the administration and management of different types of network elements are the responsibilities of different organizations. It is allowed in the network architecture to have such a desired partitioning to fit the current organizational structure for network administration and management.

The network 106 can be logically partitioned based on administrative responsibility of different organizations on different types of network elements 104. Each sub-network thus formed is called a realm and is an independent administrative entity in terms of network element user access control. To achieve the same level of access control, each realm will need to have its own set of network security servers for authentication, credential control and network element access control. A time stamp server and name server can also included. The time stamp may be deemed necessary due to the amount of traffic between the plurality of realms. The name server may be necessary if the number of user and/or network elements is so large that a pseudo-naming scheme is employed. And each set of such network security servers will be used for the control of user access to the network elements in its own realm or administrative responsibility only.

Figure 3:
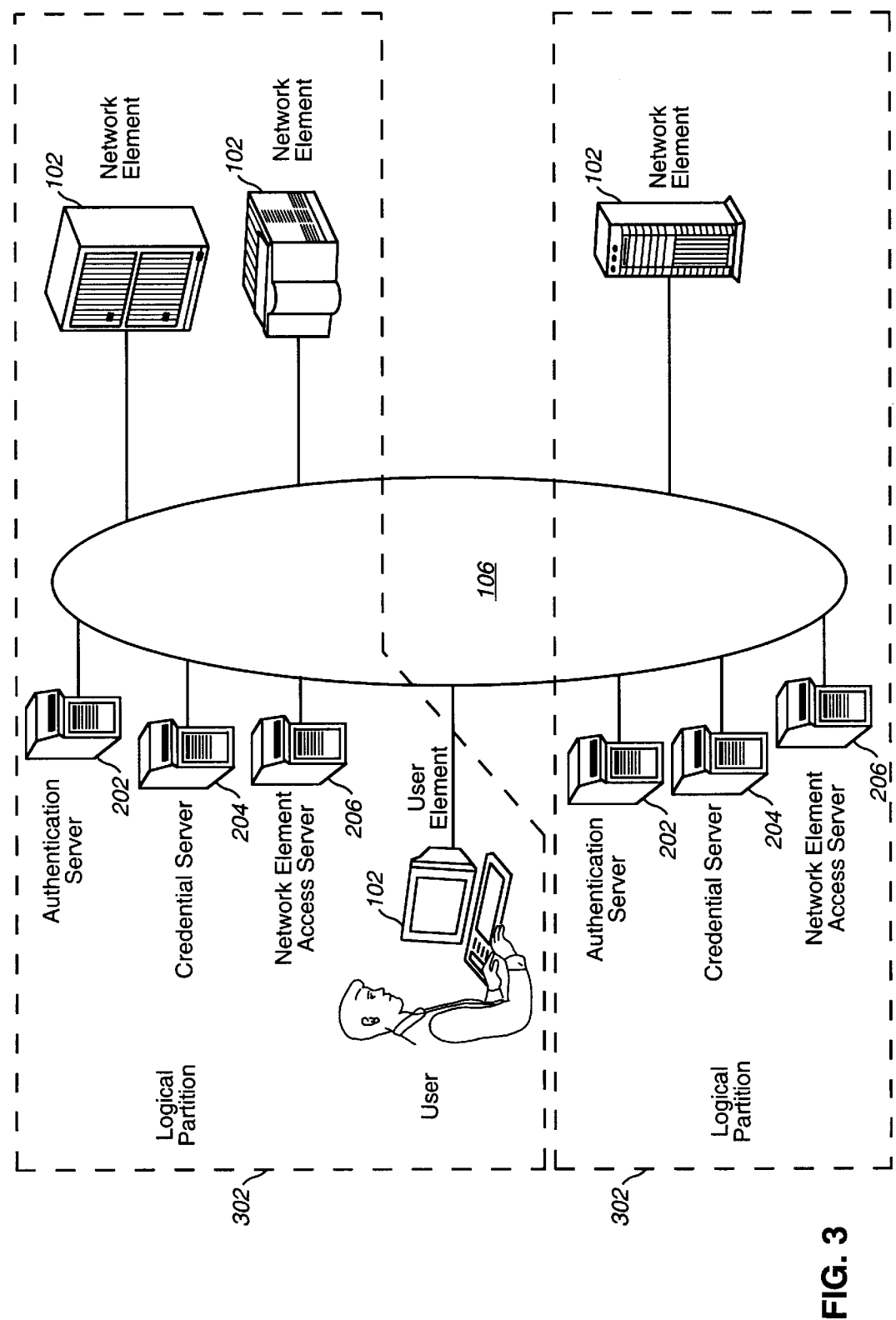
FIG. 3 illustrates another embodiment of network security in connection with the present invention.

An example of such a partition is depicted in FIG. 3. FIG. 3 shows two realms 302. Users, however, are still allowed to access network resources and information that are in a network element 104 in a different realm 302 than the current one through a mechanism called inter-realm authentication, which requires additional authentication steps across the different realms. Inter-realm authentication requires some extra work for users to access network resources and information across realms. Each realm can have its own registration database 210 (not shown in FIG. 3), or they can share a singe registration database 210. Communicating inter-realm allows network administration and management to naturally fit in the current organizational structure and, therefore, can minimize undesirable impact of the implementation of the network security mechanisms to present corporate practices in network administration and management.

2.2.6. Server Reliability and Replication

Since the authentication server 202, the credential server 204, and the network element access server 206 are essential to the enforcement of network security policy, their correct and continuous execution plays a central role in the successful and continuous operation of the network.

There are generally two kinds of risks should any of the servers fail to function correctly: unauthorized access or denial of service. The first risk, the so-called guaranteed access, happens if the default decision on a user access request is to grant the access when the security policy cannot be enforced due to the system and network failures. This is an undesirable policy and must never be employed. Fortunately, none of the security designs and implementations that are commercially available is based on this policy. However, special care must be taken in the development and testing of security products to ensure that this situation will never happen.

If the network security mechanisms can always lead to an access decision that is based on the policy of fail-safe, that is, no access is allowed unless it is explicitly granted, the risk of denial of service to user access requests occurs. Consequently, the network security servers become the essential network resources themselves for the correct operation of the entire network and for the availability of the network resources and information to authorized users. It is due to this reason that extra effort must be taken to ensure the reliability and availability of these network security servers. One direction to achieve the objective is to physically secure the network security servers to prevent them from being deliberately damaged and destroyed and to limit outside access to them only through the designated points to perform legitimate operations. The other direction to achieve the objective is to have an architecture that can tolerate system failures. This is done through the hardware and software replication of the network security servers. Replication ensures that the standby network security servers will automatically assume the overall responsibility should the primary network security servers fail. The standby servers are always properly synchronized with the primary servers so that the standby servers are capable of taking over the responsibility at the precise point where the primary servers fail.

2.3. Security Mechanisms

A variety of mechanisms to provide various levels of security for the network can be realized with the network security architecture that is presented in FIG. 2. These network security mechanisms are essential in the overall solution to protect valuable network resources and information. Following are the list of network security mechanisms to provide the desired protection to network elements. Additional requirements can also be identified to derive other useful network security mechanisms based on the network security architecture and requirements.

A system security administrator (SSA) is responsible for the administration and management of security related user and system activities. These activities include the setting up the various network security policy and the reflection of the policy in the creation and management of user information and network resources and information to assure that user access to the resources and information does not violate the policy. The role of a system security administrator is important and powerful and, therefore, must be restricted to a very limited group of people who actually carry out daily administrative tasks designated by the appropriate corporate management.

2.3.1. User Identification and Registration

User identification and registration requires that each user be assigned a network-wide unique identifier and that a database be used for the registration and management of user accounts. A user account shall consist of the unique user identifier as well as other essential user information for the control system to make access decisions for the user. Each network element that needs to be protected shall also be assigned an identifier along with an account record established in the registration database. Hence, the following description on user accounts shall be equally applicable to network elements.

User identification and registration will be centrally administered and managed at the site of the authentication server 202. A registration database (Reg. DB) 210, however, can also be accessed by the credential server 204 and the network element access server 206, in addition to the authentication server 202. A user who is assigned a network-wide unique identifier by the system security administrator for access to network resources and information will have to register with the authentication server 202. Generally, the user account record is created in the registration database 210 at the same time as the generation of the unique user identifier. The authentication server 202 can maintain a database of records for the user accounts in the registration database 210. Each record of a user account generally comprises the following information:

(1) The user identifier. This identifier is required and must be unique throughout the entire network within the same realm or administrative domain. It is the legal representation of the user in the network.

(2) An alias user identifier. This alias identifier is optional whose purpose is to allow the same user to be identified through multiple means.

(3) The list of user credentials. This list shall reflect the most recent changes to the privilege set for the user. The privilege set can be built on previous achievements or credit history. For internal network users, however, it shall primarily be used to reflect the user's job responsibilities or affiliation with specific organizations that is the usual way of defining job responsibilities.

(4) A user password. This password is a secret information only known to the user and the network security servers, is required for authentication purposes, and is essential to ensure the effectiveness of the network security mechanisms.

(5) Other administrative information to enhance the effectiveness of the network security mechanisms. The information includes, but not limited to, the minimum length of the password, the required variation of password characters, the expiration date or the lifetime of the password since creation, the maximum lifetime of each authentication, and the maximum number of failed authentication attempts that is allowed before the account is brought to the attention to the system security administrator for examination or is simply disabled temporarily pending such an examination.

It is desirable that a database tool be provided for the system security administrator to create, delete, disable and modify a user account. Such a tool should provide a user-friendly interface to aid the system security administrator to effectively and conveniently manage user accounts, as would be apparent to a person skilled in the art. This requirement should not be under-looked as correct user account administration and management is the basis for all other effective network access control mechanisms.

2.3.2. User Network Authentication

User network authentication requires that a network security server 208 that is mutually trusted by the authenticating parties be relied upon to help the mutually suspicious parties to establish mutual trust on the identity of the parties. It also requires that a password or secret key be employed as the primary means for authentication. This secret key should only be known to the party to which the associated user identifier is assigned. If the authentication mechanism uses a symmetric key scheme, i.e., the same secret key is used for both encryption and decryption purposes, the secret key can also be known to the network security server 208 that performs network authentication.

User network authentication will be centrally controlled by the authentication server 202. Through message exchanges with the authentication server 202, a user accomplishes the goal of authenticating himself/herself to the network. The basic requirement for the message exchanges is to have necessary functional modules in the authentication server 202 and in the user element 102 through which the user performs the required authentication steps, such as a graphical user interface (GUI) based application running on the user element (e.g., on the user's P.C.). The key for the user to achieve this network authentication is that the user possess the correct password or secret key for the presented user identifier. The authentication process can thus be briefly described by the following steps:

(1) The user uses a user element 102 and initiates the authentication process by requesting to send a request message to the authentication server 202. The request message contains the user identifier presented to the authentication server 202 for user network authentication.

(2) Upon receiving the user request message, the authentication server 202 uses the user identifier in the message to look up the user registration database 210 and retrieves a record corresponding to that user (user record). A response message is prepared by the authentication server 202 and sent back to the user. The response message contains a general ticket for the user to communicate with the credential server 204 for authentification. It also contains a secret key generated by the authentication server 202 to facilitate secure communications between the user and the credential server 204. Furthermore, the response message is encrypted with the user's secret key so that only the legitimate user that possesses the correct secret key can retrieve the ticket from the message.

(3) Upon receiving the response message, the user will be requested to present the correct secret key to a local access control system (LACS; not shown) in the user element 102. The user-supplied secret key is then used to decrypt the response message for the user to retrieve the correct ticket. The content of the ticket is not able to be observed and cannot be changed by the user, thanks to the encryption/decryption and standard integrity checksum mechanisms that are applied to the ticket. Any attempts by the user to try to make any changes to the ticket, intentional or unintentional, will be detected by the credential server 204 when it is used for communications with the credential server 204 and, therefore, would void the ticket and make it useless. This is to prevent the user from modifying the ticket to gain any unauthorized network access rights.

By presenting the correct secret key to the local access control system, the user authenticates his/her identity to the network. The correctness of the user-supplied secret key is verified through the process of decrypting the response message. It is the ability to retrieve the ticket in the message that allows the user to proceed with the network access control process to access network resources and information. However, this user is prevented from making any changes to the retrieved ticket.

2.3.3. User Credential/Privilege Control

User credential/privilege control requires that the credential server 204 be relied upon to provide and certify the user credential information to be presented to a network element 104 for the local access control system to make further access decisions on network resources and information. It also requires that the user first establish network authentication with the authentication server 202 in order to obtain a ticket to communicate with the credential server 204.

User credential/privilege control is centrally controlled by the credential server 204. Through message exchanges with the credential server 204 with the correct ticket, a user will obtain the list of certified credentials that the network elements 104 can rely on to make further access decisions that are reached based on the user credentials. The basic requirement for the message exchanges is to have necessary functional modules in the credential server 204 and in the user element 102 through which the user performs the required steps to get the list of certified credentials. The key for the user to achieve this credential certification is that the user possess the correct ticket issued by the authentication server 202 at the time of network authentication. The process for the user to obtain the list of certified credentials can thus be briefly described by the following steps:

(1) The user sends a message to the credential server 204 to request for a list of the user credentials. The message contains the ticket obtained by the user from the authentication server 202. The credential server 204 will not accept and process the request without being presented with the correct ticket from the user. The request message is encrypted with the temporary user-credential server secret key so that only the credential server 204 is able to retrieve the content of the message.

(2) Upon receiving the request message, the credential server 204 retrieves the information in the ticket and verifies that the request is indeed sent from the correct user. Based on the user identifier, the credential server 204 will retrieve the list of user credentials from the registration database 210 and enclose the list in a credential ticket. The credential ticket is sent back in a response message and will be used for the user to communicate with the network element access server 206. The response message also contains a temporary secret key generated randomly by the credential server 204 to facilitate secure communications between the user and the network element access server 206. The message is encrypted with the temporary user-credential server secret key so that only the correct user is able to retrieve the needed ticket and other information from the response message.

(3) Upon receiving the response message at the user element 102, the temporary user-credential server key is used to decrypt the message for the user to retrieve the correct ticket and the temporary user-network element access server secret key. The content of the ticket is not able to be observed and cannot be changed by the user, thanks to the encryption/decryption and the integrity checksum mechanisms that are applied to the ticket. Any attempts by the user to try to make any changes to the ticket, intentional or unintentional, will be detected by the network element access server when it is used for communications with the server 106 and, therefore, would void the ticket and make it useless. This is to prevent the user from modifying the list of certified user credentials as well as other information in the ticket to gain unauthorized network access rights.

By presenting the correct ticket to the credential server 204, the user is able to obtain the list of user credentials necessary for requesting access to network resources and information. The ability to obtain the list of user credentials also rests on the possession of the correct secret key known only to the user and the credential server 204. However, this user is prevented from making any changes to the list of user credentials.

2.3.4. User Authorization Control to Network Elements

User authorization control to network elements 104 requires that the network element 104 access server (not shown) be relied upon to provide necessary information to be presented to a network element 104 for the local access control system to make final access decisions on network resources and information. It also requires that the user first establish network authentication with the authentication server 202 and obtain the list of user credentials in order to obtain a ticket to communicate with the network element access server 206. Instead of accessing the user account registration database 210, the network element access server 206 maintains and accesses the access control lists built for the network elements 104 or for the users. This network element access server 206 is the only place in the network that maintains such access control lists. Thus, administration and management of access control lists is centralized at the network element access server 206.

A first type of access control list is constructed for each network element. The access control list for a given network element comprises a list of user identifiers and user credentials. The presence of a user identifier in this list specifies that the user is allowed access to the corresponding network element and that of a user credential in this list specifies that all users with this particular credential is allowed access to the network element.

A second type of access control list is constructed on the basis of a user or a user credential for each user or user credential. Contained in this list are a list of network elements that are allowed to be accessed by the user or the users that have the user credential. Access control lists can also be based on the combination of a user identifier and a list of user credentials if desired to further refine the granularity of access control to network elements. Same as the network element based access control lists, the construction of such hybrid lists is straightforward but the access decisions will be made in different manners, which is an implementation issue to be dealt with in the development. Any particular implementation either available from or preferred by system developers can be supported in the network security architecture of the present invention.

As noted above, user access to network elements is centrally controlled by the network element access server 206. Through message exchanges with the network element access server 206 using the correct ticket, a user will be able to obtain a separate ticket to access the specified network element. The basic requirement for the message exchanges is to have necessary functional modules in the network element access server 206 and in the user element 102 through which the user performs the required steps to get the required ticket. The key for the user to succeed in this step is for the user to possess the correct ticket issued by the credential server 204 at the time of obtaining the list of user credentials. The process for the user to obtain the required ticket can thus be briefly described by the following steps:

(1) The user sends a message to the network element access server 206 to request for a ticket to access a specified network element 104. The message contains the ticket obtained by the user from the credential server 204 and the identifier of the network element 104 to which the user wishes to access. The network element access server 206 will not accept and process the request without being presented with the correct ticket from the user. The request message is encrypted with the temporary user-network element access server secret key so that only the network element access server 206 is able to retrieve the content of the message.

(2) Upon receiving the request message, the network element access server 206 retrieves the information in the ticket and verifies that the request is indeed sent from the correct user. Based on the identifier of the network element 104 presented by the user or based on the identifier of the user and the list of user credentials, the network element access server 206 will retrieve the access control list for the specified network element or for the user and user credentials to determine if the user is allowed to access the specified network element 104. If the check is successful, the network element access server 206 will prepare and send a new ticket back to the user in a response message to be used by the user to communicate with the specified network element 104 for access to the resources and information in that element. The ticket contains, in addition to other information, the list of credentials echoed back to the user. The response message also contains a temporary secret key generated randomly by the network element access server 206 to facilitate secure communications between the user and the specified network element 104. The message is encrypted with the temporary user-network element access server secret key so that only the correct user can retrieve the ticket and other information from the message.

(3) Upon arriving of the response message at the user element 102, the temporary user-network element access server key is used to decrypt the message for the user to retrieve the correct ticket and the temporary user-network element secret key. The content of the ticket is not able to be observed and cannot be changed by the user, thanks to the encryption/decryption and the integrity checksum mechanisms that are applied to the ticket. Furthermore, any attempt by the user to try to make any changes to the ticket, intentional or unintentional, will be detected by the network element 104 when it is used for communications with the element and, therefore, would void the ticket and make it useless. This is to prevent the user from modifying any information in the ticket to gain any unauthorized network access to the network element.

By presenting the correct ticket to the network element access server 206, the user is able to obtain yet another ticket that is absolutely necessary for access to network resources and information in the specified network element 102. The ability to obtain this ticket also rests on the possession of the correct secret key known only to the user and the network element access server 206. However, this user is prevented from making any changes to the content of the newly-obtained ticket.

2.3.5. User Authorization Control to Network Resources and Information

User authorization control to network resources and information requires that local access control mechanisms be included in the network elements. The local access control mechanisms are integrated with the relevant software module that makes use of the information contained in a presented ticket. This module has the following functionality to make the network security mechanisms effective:

(1) It uses the secret key for the identifier of the network element and the same encryption and decryption algorithm as that used by the network security servers to decrypt the ticket presented by the user who wishes to access network resources and information in the element.

(2) It uses the temporary user-network element secret key and the encryption and decryption algorithm to conduct secure communications with the user.

(3) It can extract the necessary information from a user request for the local access control mechanisms and pass the information to the local control system to honor or to deny the access request by the local access control system.

(4) It can interpret the return result from the local access control system and prepare the response message to the user.

Traditional applications and processes in network elements that control access to resources and information can be enhanced with the above functionality to be able to make full use of the security services offered by the network security servers. On the other hand, the local access control system can be disabled because it is no longer needed in addition to user network authentication of the present invention. This would effectively move the responsibility of user account administration and management to the network security servers (server 208) and relieve the tremendous burden of managing multiple copies of user accounts and synchronizing these copies on different network elements.

This enhancement to local applications and access control systems is not affected by the way access control is actually performed as long as a clear and well-formed interface is defined and utilized to facilitate exchange of information between them as would be apparent to a person skilled in the relevant art.

2.3.6. Data Encryption and Decryption

Data encryption and decryption requires that an effective algorithm be used and a piece of secret information called a key be created and managed. The algorithm takes the data whose content is desired to be hidden from public comprehension and the secret key and goes through a procedure to manipulate the data so that the encrypted data cannot be easily, if not impossibly, reversed without the possession of the same or another correct key to decrypt the data.

Data encryption and decryption can be supported in the network security architecture to provide secure communications between users and network elements. It is also required for all the network access control mechanisms during authentication, credential certification and network element access control. Fortunately, such algorithms and procedures are commercially available and have been proven to be very effective to be used for secure communications.

The program for data encryption and decryption needs to be installed in all types of elements in the network and be properly used to support network access control as well as regular user communications with the network elements.

2.3.7 Information Integrity Protection

Information integrity protection refers to the ability of securing system and user information from being modified. Information integrity is ensured primarily by two different mechanisms. One is for the protection information integrity in local systems and the other is for that in the network during information exchanges.

In local systems, the integrity of information is ensured by the access control mechanisms discussed above. The requirement on such access control mechanisms for the protection is the presence of the access rights to create, modify and destroy information and the proper administration and management of such access rights. That is, integrity control relies on access control and, consequently, is supported by the network security architecture of the present invention.

For information that travels in the network, local access control is not useful at all and it is not possible to guarantee the integrity of a message. This is due to the fact that the network 106 that connects the various network elements 104, the users and the network security servers 208 are not secure by their nature and is almost impossible to be physically secured except in few isolated situations in which the network is fairly small and can be contained in a small area so that it becomes feasible to apply physical security measures to all the links and nodes. Unfortunately, large enterprise networks do not meet this criterion. Consequently, integrity of information is protected by the use of the checksum against whatever information is desired to be protected and by the inclusion of the checksum in the message that contains the original information. Furthermore, the level of protection is guaranteed only to have the capability to detect any modification to the message by recomputing the checksum at the receiving element and the comparing the two checksums. Should a mismatch be detected, the receiving local system may invoke the necessary recovery process to either self-correcting the errors based on the checksum comparison result if it is capable of doing so or requesting the sender to re-transmit the message. Conventional mechanisms for information integrity control can readily be adapted for use with the network security architecture of the present invention. In addition, such integrity mechanism will be utilized by the network security servers 208 in network access control.

2.3.8. Security Auditing

Security auditing mechanism is primarily used for the detection of malicious attempts that try to circumvent the other security mechanisms. It also helps unveil and correct system security flaws that result from design limitations and development and implementation mistakes. The primary requirement for security auditing is to have a real-time and independent software module that executes on a local system to monitor all system and network activities that are carried out in the local system.

Security auditing can be implemented for a number of events with user authentication and access control being the primary concerns, however. Depending on what events are desired to be monitored, security auditing can be implemented and turned on for the authentication server 202, the credential server 204, the network element access server 206, and individual network elements. The network security architecture fully supports this capability no mater what events need to be audited. It thus becomes an implementation and operation issue as to what is to be audited and where and when to install and turn on the security auditing modules.

It is important, however, to have the flexibility of specifying the events that are desired to be audited. This flexible feature should allow the capability to specify a user as the basic security auditing objective, which leads to the monitoring and logging of all the activities related to the specified user. It can also allow the capability to specify a particular event as the basic security auditing objective, which leads to the monitoring and logging of all user activities related to the specified event. The auditing trail consists of a series of records with each one being for a particular event. Such a record shall at least contain the user identifier, system event, user access request parameters, access decision by the network access control system, and the result of the action to the network resource or information if the access is allowed to be carried out.

2.4. System Integration

System integration requires the combination of individual solutions to provide an integrated flow of procedures for network security and to apply and enforce the integrated flow to all user requests to access network resources and information. System integration also requires that individual functional modules be fully tested against the specified requirements and functions. System integration may need some development work to be performed and will require integrated testing to be carried out.

2.4.1. Integration of Functional Modules

As discussed above, it is not uncommon that certain security functions and mechanisms that are identified in the network security architecture be combined together in the hardware and software development and implementation. Some integration will be apparent because it is needed to make the security mechanisms effective. For example, data encryption and decryption is required for all information exchanges between any two elements (102 or 104) in the network 106. Consequently, it must be used by the network security servers 208 as well during user authentication, credential control and network element access control. The integrity checksum mechanism that deals with message integrity problem in the network falls into the same category. Hence, it is also integrated with all other network security mechanisms that require information exchanges between elements. The objective of such a system integration is to achieve the effectiveness of the various network security mechanisms.

Other types of system integration are also possible and may be highly desirable. One type is the integration of the local log-on and the network authentication of a user. Before network authentication is implemented, individual user and network elements offer and follow their own authentication procedures that are primarily based on the user identifier and password scheme. Since they are similar in nature as far as how a user gets authenticated is concerned, the local log-on process can be integrated with the network authentication process of the present invention. This integration provides the users with a smooth and transparent log-on process, in which a user needs only one log-on to get authenticated both to the local control system and to the network 106. Furthermore, the network authentication mechanism can be used to outdate the local log-on process to have a single user authentication to any of the elements in the network. The requirement to achieve this integration is that the network authentication server be trusted by all users and network elements to carry out user authentication both for local log-on and for remote access requests. An additional benefit of such integration is the relief of the burden for the system administration to perform security administration and management on all network elements 104 and user elements 102 individually and separately.

The second type of system integration is the combination of the three network security servers in a further embodiment of the present invention. This integration can be done at the hardware level by running all three of them on the same hardware platform to facilitate efficient sharing of data, such as the user account registration database 210. This hardware integration can be an option for the system security administrator to deal with the constraints and limitations of the available hardware resources. This integration can also be the combination of the functions of the network security servers in one software module. For example, the network authentication function (by element 206) and the credential control function (by element 204) can be combined together in one software module to achieve a better performance. The network security architecture of the present invention identifies the required functionality that is necessary for network security and, therefore, does not prohibit such an integration of network security functions.

A still further embodiment includes the combination of network element access control lists in the network element access server 206 and the access control lists in individual network elements 104 although this type of integration may not be desirable. This is because an access control list in the network element access server 206 can only be used to determine whether a particular network element 104 is allowed to be accessed by a user, whereas an access control list in a network element controls actual access rights of a user to individual network resources and information. That is, the latter provides access control in a finer granularity while the former facilitates a centralized administration and management of user access. If the requirement specifies access control to the level of individual network resources and information, the integration shall not be performed although all the access control function can be consolidated into the network element access server, which is highly undesirable due to performance and other considerations. On the other hand, access control to network elements performed by the network element access server 206 may not be necessary because such access control decisions can be delayed and made by the individual network elements 104. This is because, if a user is not allowed to access any resources and information in a network element 104, any access request to the network element 104 shall be denied provided that the access control mechanisms behave correctly and as desired. Access control to network elements 104 in the network element access server 206, however, provides efficient user access administration and management because use access to a network element 104 can be simply turned off instead of making modifications to the individual access control lists in the network element. It also accurately controls user access to network elements 104 by working with the credential server 204 that centrally manages user credentials.

2.4.2. System Integration to Meet System and User Security Requirements

From the description of the network security servers 208 and the responsibilities of other elements in the network, and from the description of the various security mechanisms, it should be apparent how individual pieces of the functionality for network security access control can be put together to achieve the desired functionality to meet the requirements of both the network elements 104 and those of the users. To the network elements 104, the integration of the following steps solve the security concerns and problems identified above.

Figure 4:
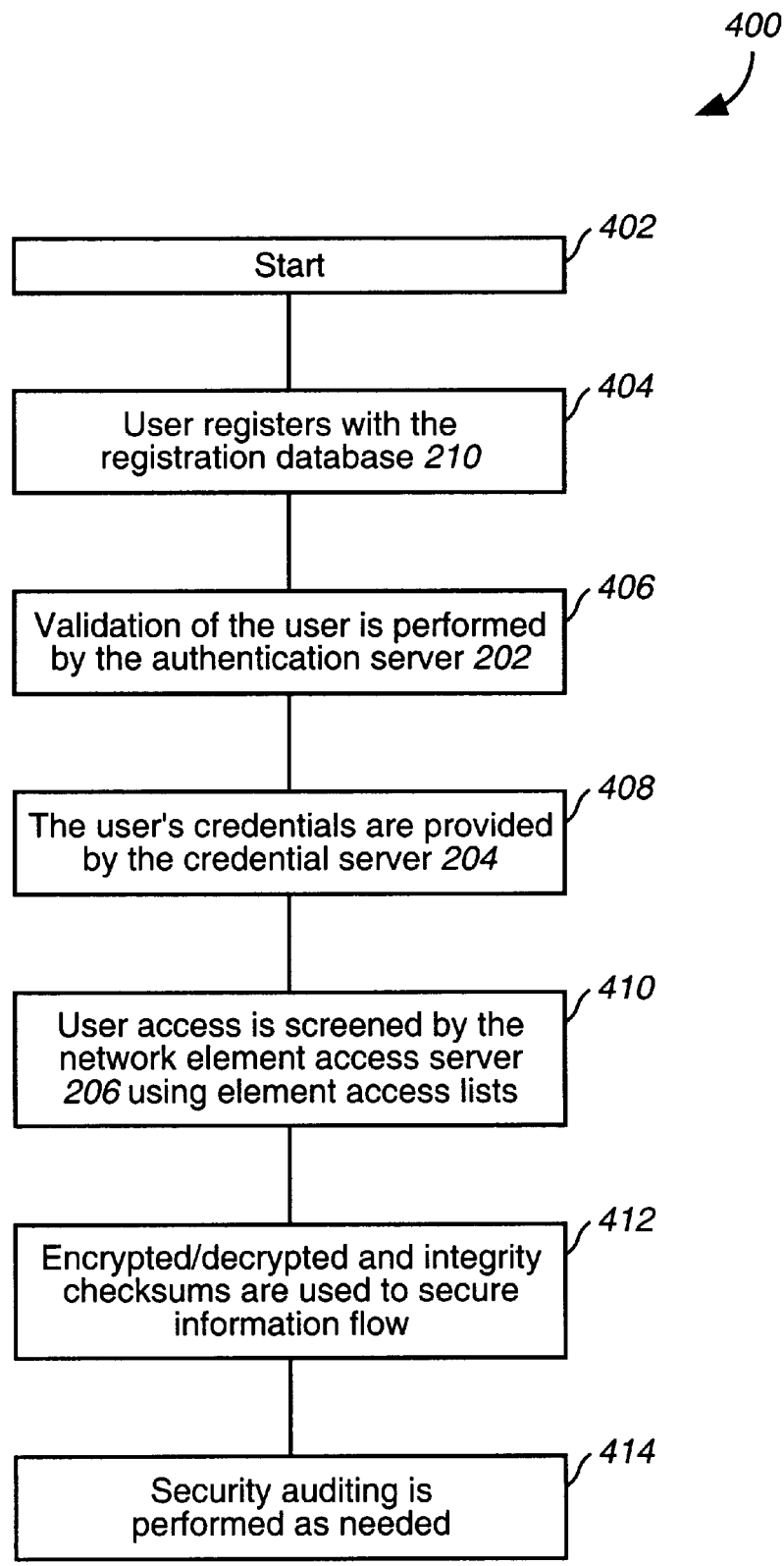
FIG. 4 is a flow diagram illustrating various operations performed in association with servers of network security server 208 in connection with the present invention.

A high-level description of a method according to the present invention will now be described in connection with a flow diagram 400 in FIG. 4. Processing starts at a step 402 and flows immediately to a user registration step, as shown at 404. The legitimacy of a user is established by requesting a user identifier and by registering the user in the user registration database 210. This can be met by the network security services 208 offered by the authentication server 202. In addition, the registration database 210 can relieve the tremendous effort for administration and management of user accounts on individual network elements by consolidating all the work to the site of the central database.

Next, the identity of a legitimate user is validated by the authentication server through the user network authentication process, as shown at a step 406. In addition, this central network authentication server 202 can relieve the burden of administration and management of individual network elements in order to maintain effective authentication control by consolidating all authentication work to the site of the authentication server 202.

Following user authentication, the correctness and preciseness of user credentials is evaluated by the credential server 204, as shown at a step 408. This functionality can also relieve the burden of administration and management of individual network elements in order to maintain effective user credential control by consolidating all user credential management work to the site of the credential server 204.

The capability to control user access to network elements by screening users via element access lists is performed by the network element access server 206, as shown at a step 410. This functionality can also provide a quick and accurate means to allow or to disallow specified users to access certain network elements by centrally maintaining the access control lists to the network elements.

The secrecy of information that flows in the network is protected by the encryption and decryption mechanism, while the integrity of information is protected by the integrity checksum mechanism, both of which are supported in the network security architecture, as shown generally at a step 412. In addition, these two mechanisms have to be used in the message exchanges for user network authentication, user credential control and network element access control to provide the necessary protection to the secrecy and to the integrity of the messages.

Finally, a security auditing mechanism helps monitor and detect attempts to break into the network elements and those to try to gain additional access that are otherwise not allowed, as shown at a step 414. It also helps unveil security flaws in system and network security control due to design and implementation limitations and mistakes.

Thus, to the user elements 102, the integration of the centralized network security server 208 solves the security concerns and problems identified above. This is a local security issue and can be solved simply by a mechanism called "secure connection". This mechanism relies on the provision of a special means from the local access control system (associated with the user or network element) to allow the user to establish a guaranteed connection to the local control system. A user can use this special means, such as a special sequence of key strokes that can be captured only by the local control system, to ensure that a secure connection is established with the local control system before the user initiates the network authentication and access control process.

The network authentication mechanism that is described above in connection with the network security architecture also assures that only the network element that is specified by the user can retrieve the information in the ticket for user to access the element. Therefore, the user shall be confident about the authenticity of the network element. The network security architecture and the security mechanisms provide this assurance.

This is also a local security issue and shall be properly assessed when the local access control system are discussed and evaluated. This is the same concern as that for the network elements regarding the secrecy and integrity of information flows in the network. As discussed earlier, the network security architecture and mechanisms provide the necessary support.

2.5. Unified User Network Access Control

Figure 5:
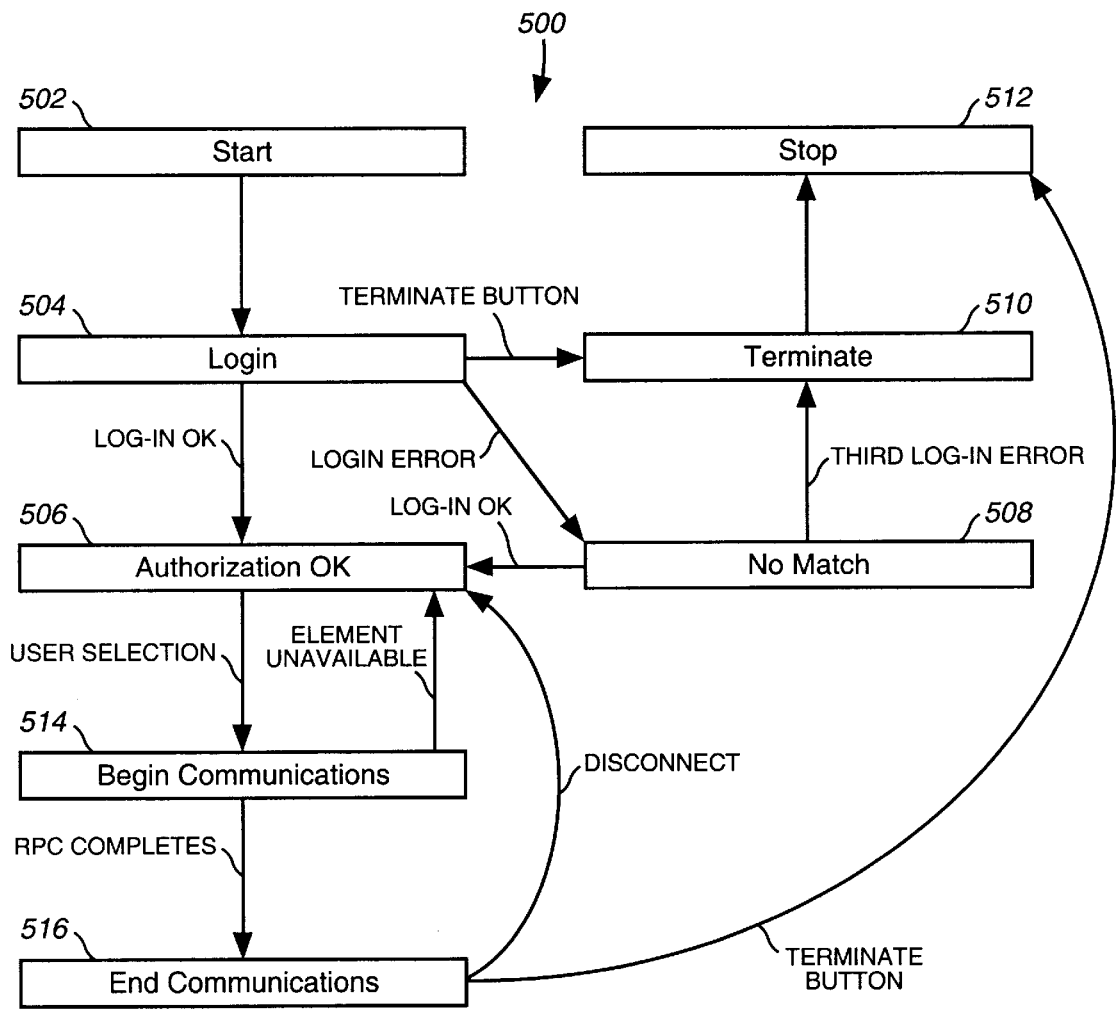
FIG. 5 illustrates an exemplary high level, state diagram of an operational flow in connection with the present invention.

FIG. 5 illustrates an exemplary high level, state diagram of an operational flow (also called a process or method) 500 according to the present invention. The process starts in a state 502 and transitions into a state 504 when a user begins to log into the network 106 via a user element 102. Upon successful completion of the log-in, the process transitions to an "Authorization O.K." state 506. If a log-in error occurs, such as no match for the user is found in the registration data base 210, the process enters a "No match" state 508. If a successful log-in completes before a fourth attempt (in this example), the process transitions to the authorization O.K. state 506. Otherwise, after a third failed log-in the process transitions to a "Termination" state 510. The process then stops at a state 512. If during the log-in state 504 the user presses a terminate button, or otherwise terminates processing, the process enters the termination state 510 and processing stops at state 512. As would be apparent to a person skilled in the art, the number of log-in attempts is implementation specific. Moreover, any network is typically a multiuser environment, multiple threads of the processes described herein are typically used for processing log-ins and, as described below, multiple requests for communication sessions from one or more users elements or network elements.

Once in authorization O.K. state 506, the user is permitted to access pull down menus to identify those network elements to which is allowed to access. The user can make an access request by clicking on one of the network elements listed by the pull-down menu. The user clicks on a desired network element to select it, or otherwise specifies a preference for connectivity with a selected network element, the process transitions into a "Begin communication" state 514. If the selected network element is not available, the process returns to the authorization O.K. state 506. The process then transitions to an "End communication" state 516 when the communication ends, as it would be apparent to a person skilled in the relevant art. If the communication completes because of a disconnect, the process transitions back to the authorization O.K. state 506. Otherwise, if the communication completes because the user presses the termination button, or otherwise specifies termination of the communication, the process transitions to the stop state 512.

Further detail concerning authorization during the log-in procedure and the transition between states 504 and 506, and between states 508 and 506 will be described now in connection with FIG. 6.

Figure 6:
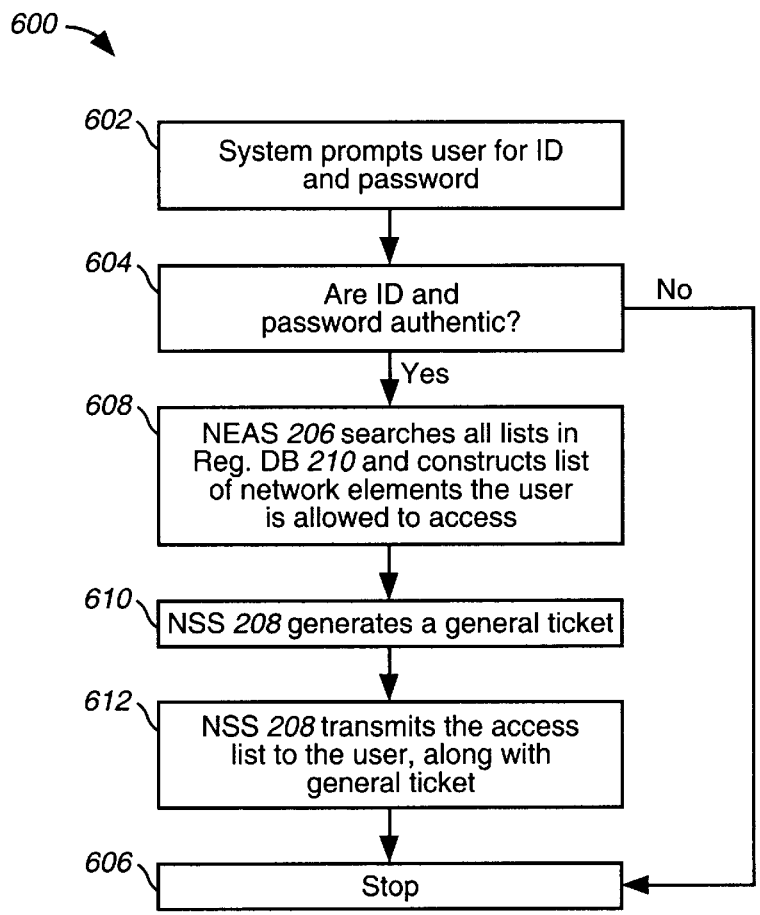
FIG. 6 illustrates a log-in procedure in connection with the present invention.

FIG. 6 illustrates a log-in procedure 600. The system prompts the user for identification (ID) and a password, as shown at a step 602. The NSS 208 verifies the ID and password using the authentification server 202 and credential server 204, as shown at a state 604. If the ID or password are not correct the process enters a stop state 606. The network element access server 206 then searches the registration database 210 and constructs a list of network elements that the user is allowed to access based on user credentials, as shown at a state 608.

The NSS 208 then generates a general ticket to be used by the user element for future network element access requests. After ID and password authentification has been completed, the general ticket is encrypted using a secrete key assigned by, and only know to, the NSS 208 so that future access requests by the same user element can be quickly authenticated by the NSS 208. This avoids the NSS 208 having to verify the ID and password each time the user element makes an access request. The NSS 208 keeps the only copy of the encryption key for the general ticket so that only the NSS 208 can decrypt the general ticket. This helps prevent unauthorized access requests by others posing as a preauthorized user element. The generation of the general ticket is shown at a state 610. The network security server 208 then transmits the access list to the user's local access control system, along with the general ticket, as shown at a state 612.

Figure 7:
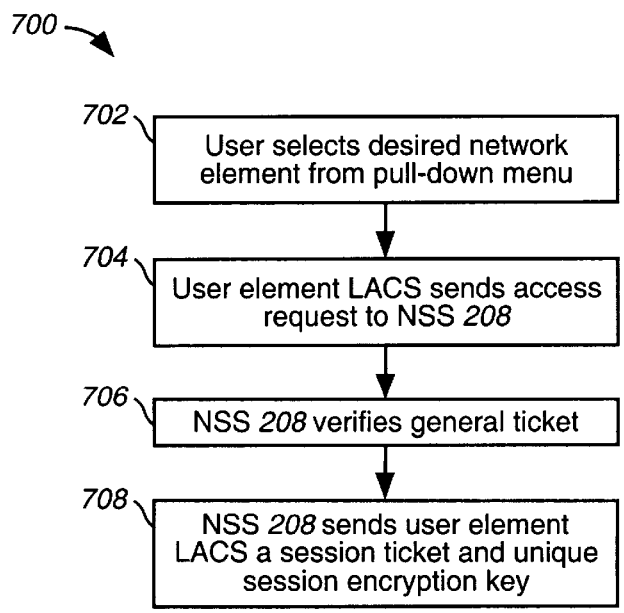
FIG. 7 illustrates an access request procedure in connection with the present invention.

FIG. 7 illustrates an access request procedure 700. Once the user selects a desired network element, as shown at a state 702, the user element local access control system sends an access request for selected network to the NSS 208 with the general ticket, as shown at a state 704. The NSS 208 first verifies the general ticket, then returns a session ticket to the user element for communicating with the selected network element, as shown at a state 706. The session ticket includes a unique session encryption key that is the same as that to be used by the user element for encrypting data for communication to the network element and by the network element for decrypting that data. The session ticket itself is encrypted using the password of the selected network element so that only the selected network element can verify the session ticket. The NSS 208 then sends the session ticket and the unique session key to the user element, as shown at a state 708.

Figure 8:
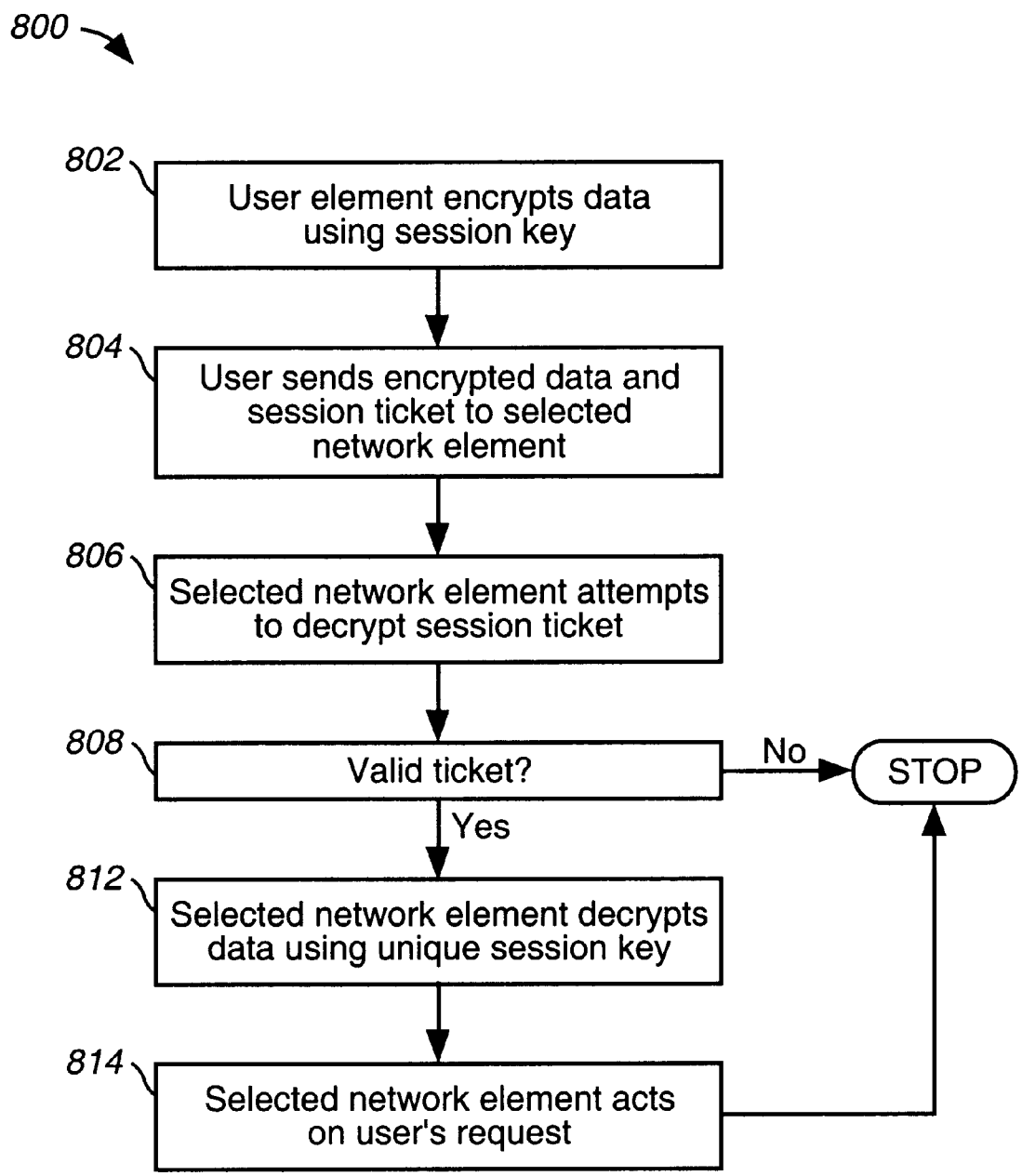
FIG. 8 illustrates a communication session between the user element and the selected network element in connection with the present invention.

FIG. 8 illustrates a communication session 800 between the user element and the selected network element. This figure depicts a communication session initiated by a user element, but it should be noted that the invention equally applies to request replies sent by the network element to access request(s) sent by the user element. Multiple access requests can be performed between the user and network elements during a single session. Thus, transfer of data during a communication sessions is bidirectional, not unidirectional as depicted in the figures, and encryption and decryption is performed for sending data in both directions, i.e., from the user element to the network element and vice versa. Also, the terms user element and network element have been selected merely as a naming convention. In other words, network elements can initiate communications sessions and make access requests to user elements or other network elements, just as user elements can initiate communications sessions and make access requests to other user elements, as well as to network elements.

Turning now to FIG. 8, the user element first encrypts the data to be communicated to the network element using the unique session key, as shown at a state 802. The user element then sends encrypted data and the session ticket to the network element, as shown at a state 804. Upon receipt of the session ticket and encrypted data, the network element attempts to decrypt the session ticket using its own password as a key, as shown at a state 806. A valid ticket is one that can be decrypted so as to yield the correct unique session key for decryption of the data. If the ticket is not valid, as determined at a state 808, the process enters a stop state 810. If the session ticket is valid, the selected network element decrypts the data using the unique session key and acts upon user request, as shown at a states 812. and 814. The process then transitions to the stop state 810. Further communication between can proceed between the user element and the selected network element for a single session using the encryption key. A session length is typically defined as the period between log-ons for a user element coupled to the network 106, or for dial-up sessions delimited by the dial-up communication protocol software. In another embodiment, the network security system 208 via the administrator can limit the number of communication links per session or time that the user element and selected network can communicate with each other.

When the user enters a log-out command, all the tickets that have been issued to the user will be destroyed. On the other hand, if the length of time that is allowed for the log-on session is exceeded, all the tickets that have been issued to the user will also become invalid and therefore be destroyed. Under such circumstances, the user has to re-log on to the user element to obtain a new general ticket for new access requests.

As would be apparent to those persons skilled in the relevant art, alternative embodiments may be appropriate for networks implementing scripts for communicating messages, and the like, within an enterprise network. In other words, scripts can be employed if the user elements access request requires access to more than one network element. It may be more efficient, from a network connectivity perspective, to have the selected network elements perform each necessary validation together with the NSS 208, rather than having the NSS 208 handle the authorizations alone. Of course, implementations details of the network protocol will impact specifically which elements will be involved in the authorization or verification process. Thus, the NSS 208 in connection with local access control systems at the elements complete an access request, and thus work together to provide security to control access to the network elements and protect network resources and information associated therewith.

3. Network Security Solutions

Commercial products are available that provide solutions to network security problems and can be adapted to implement particular features of the present network security mechanisms invention. These solutions range from network authentication to access control, to data encryption and decryption, and to security auditing. As would be apparent to a person skilled in the relevant art, not all solutions meet the requirements of very large networks, and thus is implementation specific. This section includes a discussion of some of the commercially available solutions and identifies those that meet network security requirements according to the present invention, fit the disclosed network security architecture, and provide the necessary network security mechanisms.

3.1. Network Access Control

Network access control includes the functionality of the three network security servers. As discussed earlier, the present invention allows local access control mechanisms to make the further access control decisions for user access to individual network resources and information. Should such mechanisms be determined inadequate, the hardware vendors or some independent software developers can provide the required functionality with minimal effort. Furthermore, the integration of the network security mechanisms and local access control mechanisms also requires that vendors be requested to retrofit or upgrade the local security control systems to facilitate the integration. This is necessary to make the network security access control work effectively and efficiently.

There are primarily two types of solutions for network authentication. One is based on the scheme of token authentication, but it is not the preferred solution and will be addressed last. The other is based on Kerberos software ticket and cryptography.

3.1.1. Kerberos Authentication Based Solutions

Kerberos is a network authentication software that was originally developed at MIT and has been widely supported by major computer hardware and software vendors on various open system platforms. Kerberos relies on open system technologies and a special authentication procedure to accomplish network authentication. However, it does not depend its effectiveness on the secrecy of the procedure. Nor does it require any algorithms used in the authentication procedure to be kept secret as the prerequisite for its effectiveness. Instead, Kerberos authentication procedure relies on the user secret password and the way in which authentication messages are constructed to ensure the correct authentication of a user. Furthermore, Kerberos authentication procedure does not cause the user passwords to be transmitted as any message content. That is, user passwords will only remain at local systems and will be well protected by local access control mechanisms. Therefore, user passwords will not be exposed to insure that the open network is not subject to malicious attempts to circumvent the network security mechanisms.

Kerberos can also meet the needs for the security of a large enterprise network. This is because it does not limit the number of network elements to be served in order to maintain its effectiveness. Nor is there any limitation on the number of users a Kerberos authentication server can serve since Kerberos gets the user information from the user account registration database 210 maintained by the network authentication server 208. One implication is that a user can access a number of network elements 104 within a single authentication session established with the authentication server 202 through the request of the appropriate tickets to the different network elements from the network element access server 206 by using the same ticket issued by the authentication or the credential server. The other implication is that the addition of users and network elements to Kerberos authentication is by the creation of entries or records into the registration database 210. Because of the consolidation of network security administration and management to the site of the central registration database 210, the scale of the network in terms of the number of network elements and that of the users does not cause any complexity to the task of network security administration and management. This relieves a great burden from the system security administrator and inevitably increases the effectiveness of the network security mechanisms and the efficiency of network administration and management.

3.1.2. Token Authentication Based Solutions

In this scheme, besides the normal user log-on procedure, the authentication server can generate a unique challenge to the user. Unless the user can successfully respond to the challenge, the user authentication will be denied. Although there are variations on how the challenges and the responses are generated, the effectiveness of token authentication rests on whether the challenges and responses can be made unpredictable and less likely to be repeated within a short period of time. SecureID, manufactured by Security Dynamics Inc., is such a product that is based on the scheme of token authentication. The way in which SecureID matches the challenges and responses relies on the synchronization of the challenges generated by the authentication server and the responses generated by the SecureID token of the user. Although it has been shown that network authentication based on tokens like SecureID can be very effective for user authentication, there are some serious drawbacks and limitations that make such solutions unsuitable for a large network security architecture.

4. Integration with the Dial-Up Access Network

Presently, many large networks provide a dial-up option for user access to network elements. This section describes another embodiment of the network security architecture that integrates this dial-up access network with the network security mechanisms described above to allow transparent dial-up access through the primary Kerberos network security mechanisms. This embodiment also provides the capability of automatically switching to the dial-up access network in the event of Kerberos system failure.

Figure 10:
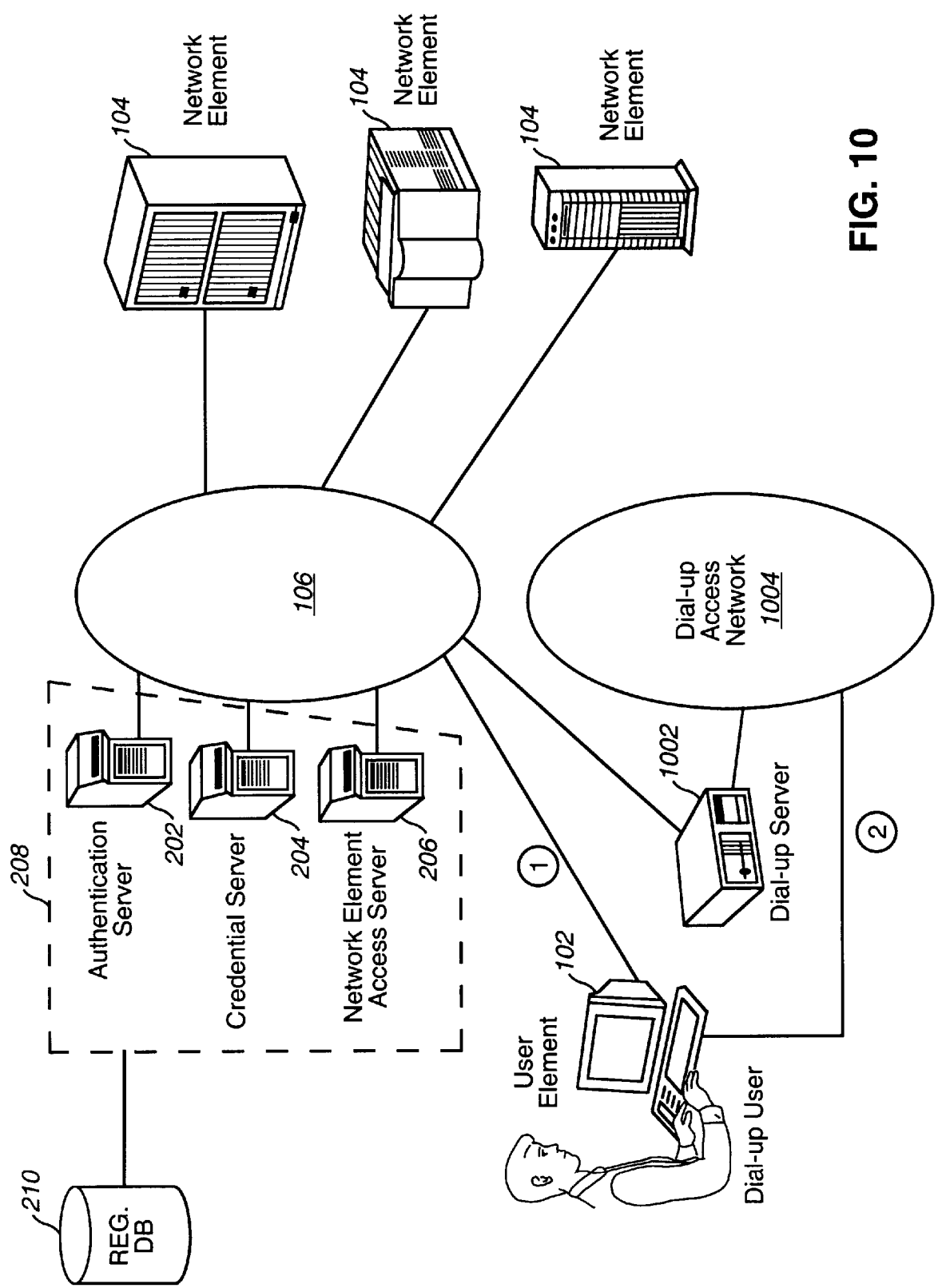
FIG. 10 illustrates a dial-up access network in connection with the present invention.

This integrated network security architecture is depicted in FIG. 10, in which the only addition to the security network is a dial-up server 1002. The functions of the dial-up server 1002 are:

(1) To interface dial-up users with the network 106, and (2) To automatically control the switching of the dial-up users to the dial-up access network in the event of the failure of any Kerberos network security servers and the unavailability of the required security services.

The network 106 is primarily a data network based on virtual circuit and connectionless datagram services, while a dial-up access network 1004 relies on a public telephone network, or the like, for a switched physical connection between a user and a network element. Therefore, the dial-up server 1002 must be capable of supporting both the network communication protocols such as TCP/IP (transmission control protocol, which the major transport layer protocol in the Internet that provides reliable virtual connectivity for communications between two internet nodes, or in this case between any two elements—user, dial-up user and network elements) to connect the user to the network, and the dial-up access protocols such as Procomm Plus (not shown) to connect the user to the dial-up access network. In addition, the Kerberos client software must be executed in the dial-up server to use Kerberos network security services by the user. Regular users, however, do not have the option of selecting which access network, i.e., the network or the dial-up access network, they wish to use to access network elements. In the normal situation, a dial-up user access request is handled in the following steps:

(1) The user dials into the dial-up server. The server authenticates the user based on any one of the available mechanisms in the module.
(2) The dial-up server invokes the Kerberos client process and uses the user identifier and password to authenticate the user to the network.
(3) If Kerberos authentication is successful, user access to network elements will proceed with the security services offered by the Kerberos network security servers.
(4) If Kerberos authentication times out due to problems in the network or in the Kerberos network security servers, after a number of repeated such failures, the dial-up server will switch user to the dial-up access network and proceed with the steps that are used for user access to the network elements.

There are two issues that need to be addressed for the automated switching of user dial-up access to network elements. First, the number of failures that are allowed for Kerberos network authentication before the user is switched automatically to the dial-up access network shall be determined and set up by the system security administrator. Regular users shall not be allowed to specify and to change this setup. The time-out value for the determination of Kerberos network authentication failure shall also be limited to the system security administrator. Note that the failure of user Kerberos network authentication and that of the network or Kerberos network security servers should be differentiated. The first type of user authentication failure is caused by the user not being able to be authenticated and, therefore, shall be treated as a normal response as far as the dial-up server is concerned. In this case, the user will be notified of the authentication result and shall not be switched over to the dial-up access network. To the dial-up server, only the user authentication failures that are caused by no response which would eventually triggers the time-out or by some error response conditions that clearly indicate the network or Kerberos failure count towards the final determination to automatically switch the user to the dial-up access network.

Second, a dial-up user needs to first dial and connect to the dial-up server before further network authentication takes place in the order of through the Kerberos network security mechanisms then through the dial-up access network in the case of unavailability of the network or the Kerberos network security services. The procedure to dial into the dial-up server depends on the way it is actually implemented.

The dial-up server can be deployed where it is close to the users. Since it is merely a client to the network security servers, the dial-up server 1002 does not have to be a powerful server machine. Therefore, the cost of a large scaled deployment should not be very high. The benefit, on the other hand, is that this would result in a dramatically increase in the number of network access points of presence, even in places where it is not currently feasible to use dial-up access that is based on the toll-free numbers.

5. Computer Program Product

Figure 9:
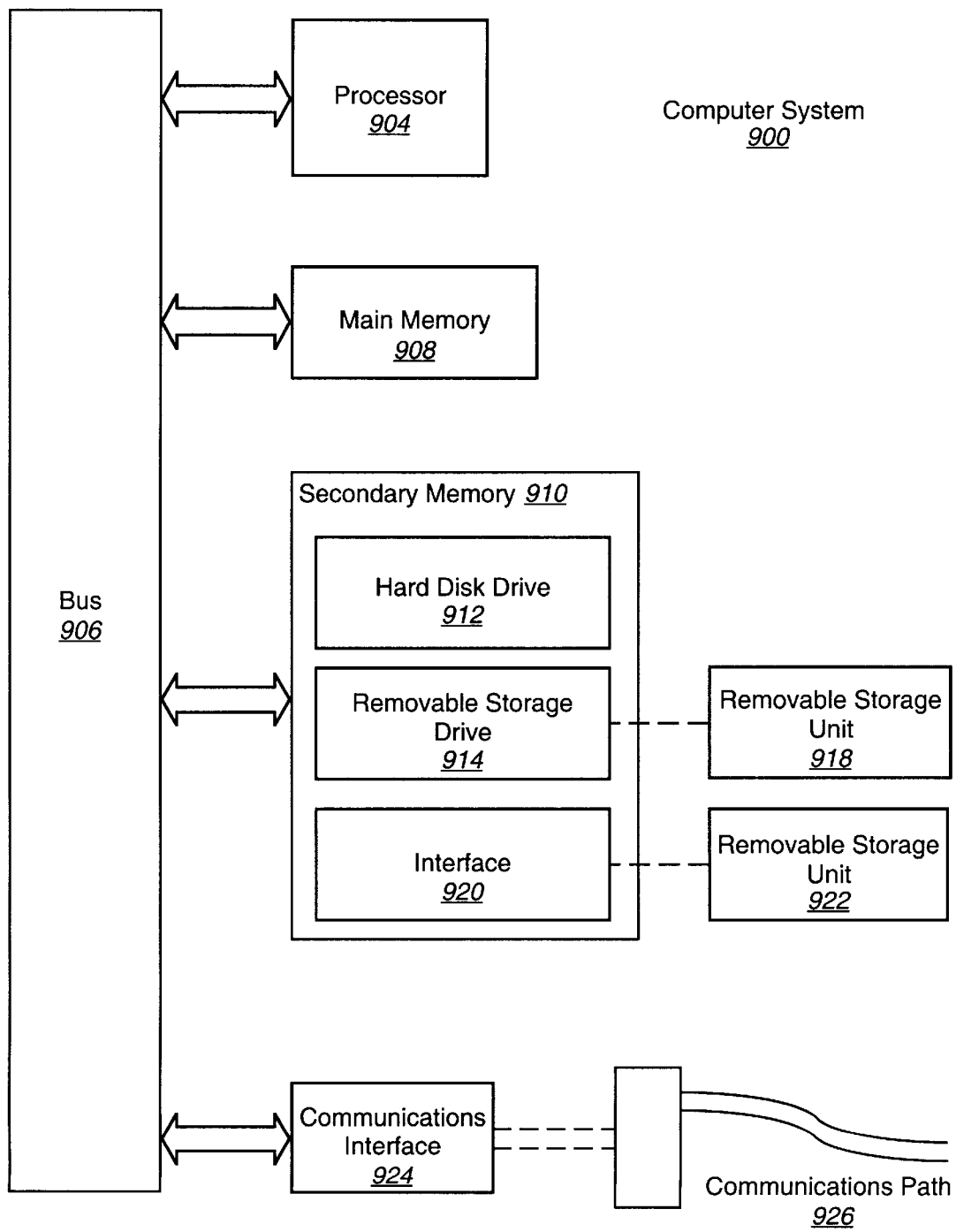
FIG. 9 is a computer environment for implementing various servers and elements in connection with a computer program product for the present invention.

An exemplary computer environment for implementing one or more of the servers, user elements or network elements according to the invention is shown in FIG. 9. The environment is a computer system 900 that includes one or more processors (CPU), such as processor 904. The processor 904 is connected to a communications bus 906. Various software embodiments are described in terms of this example computer system. After reading this description, it will be apparent to a person skilled in the relevant art how to implement the invention using other computer systems and/or computer architectures. Computer system 900 can be used to implement PC 104 and/or the PBX 114.

Computer system 900 also includes a main memory 908, preferably random access memory (RAM), and can also include a secondary memory 910. The secondary memory 910 can include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well known manner. Removable storage unit 918 represents a floppy disk, magnetic tape, optical disk, etc., which is read by and written to by removable storage drive 914. As will be appreciated, the removable storage unit 918 includes a computer usable storage medium having stored therein computer software and/or data.

In alternative embodiments, secondary memory 910 may include other similar means for allowing computer programs or other instructions to be loaded into computer system 900. Such means can include, for example, a removable storage unit 922 and an interface 920. Examples can include a program cartridge and cartridge interface, a removable memory chip (such as an EPROM, PROM, or PCMCIA) and associated socket, and other removable storage units 922 and interfaces 920 which allow software and data to be transferred from the removable storage unit 922 to computer system 900. Any of the aforementioned memory devices can be used to implement a database.

Computer system 900 can also include a communications interface 924. Communications interface 924 allows software and data to be transferred between computer system 900 and external devices via communications path 926. Examples of communications interface 924 can include modem 106, printer 108, a communications port, etc. Software and data transferred via communications interface 924 are in the form of signals that can be electronic, electromagnetic, optical or other signals capable of being received by communications interface 924 via communications path 926. Note that communications interface 924 provides a means by which computer system 900 can interface to a network such as LAN 110.

The present invention is preferably implemented using software running (that is, executing) in an environment similar to that described above with respect to FIG. 9. Thus, the term "computer program product" is used to generally refer to a program stored at removable storage device 918 or a hard disk installed in hard disk drive 912. These computer program products are means for providing software to computer system 900.

Computer programs (also called computer control logic) are stored in main memory and/or secondary memory 908 and/or 910, respectively. Computer programs can also be received via communications interface 924. Such computer programs, when executed, enable the computer system 900 to perform the features of the present invention as discussed herein. In particular, the computer programs, when executed, enable the processor 904 to perform the features of the present invention. Accordingly, such computer programs represent controllers of the computer system 900.

In an embodiment where the invention is implemented using software, the software may be stored in a computer program product and loaded into computer system 900 using removable storage drive 914, hard drive 912 or communications interface 924. Alternatively, the computer program product may be downloaded to computer system 900 over communications path 926. The control logic (software), when executed by the processor 904, causes the processor 904 to perform the functions of the invention as described herein.

In another embodiment, the invention is implemented primarily in hardware using, for example, hardware components such as application specific integrated circuits (ASICs). Implementation of a hardware state machine so as to perform the functions described herein will be apparent to persons skilled in the relevant art(s).

6. Conclusion

The above description presented a network security architecture to provide protection to user access to the resources and information in network elements. A set of network security mechanisms was also identified and described which are supported by the three proposed network security servers, i.e., the authentication server 202, the credential server 204, and the network element access server 206. Combined with other mechanisms such as data encryption and decryption and integrity checksum, the security services offered by the network security architecture of the present invention provide a comprehensive solution to network security for user access to network elements.

Based on the proposed network security architecture and the mechanisms required, the description included detailed implementation of the present invention using specific network security products that are commercially available today, primarily in the areas of network authentication and cryptography. Finally, the network access with the Secure Access Manager (SAM) dial-up access was discussed.

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents. All cited patent documents and publications in the above description are incorporated herein by reference.

What is claimed is:

1. A system for securing access to network elements by user elements, wherein the network elements and the user elements are coupled to a network, the system comprising:
   a network security server coupled to the network, wherein said network security server provides security mechanisms to control access to the network elements and protect network resources and information, wherein said security mechanisms comprise:
      an authentication server that prepares a response message responsible for authentication of the network users to network elements;
      a credential server responsible for controlling the network user credentials or privileges;
      a network element access server responsible for controlling of access to the network elements by the user elements, wherein access to the network by the user is based upon verification of a combination of the credentials; and
   a registration database to facilitate administration and management of access to the network by the user elements, wherein said registration database stores user identifiers, a list of user credentials, user passwords and administrative information to enhance effectiveness of said security mechanisms;
   wherein each of the user elements and the network elements includes a separate local access control means operating in conjunction with said security mechanisms to facilitate secure communication of data over the network.

2. The system of claim 1, wherein the network security server issues a general ticket to each user element at log in, wherein said general ticket is used by the network security server for authentication of access requests by the user elements.

3. The system of claim 2, wherein one of said security mechanisms includes first means for providing a session ticket to a requesting element in response to a network element access request to access any resource or information in a selected element, wherein said requesting element and said selected element can be one of the user or network elements, and said session ticket includes information that has to be present for all communication between said requesting element and said selected element.

4. The system of claim 2, wherein one of said security mechanisms includes second means for providing a unique session key to a requesting element in response to a network element access request to access any resource or information in a selected element, wherein said requesting element and said selected element can be one of the user or network elements, and said unique session key is used by said local access control means associated with said requesting element and said selected element for encryption and decryption of communications between said requesting element and said selected element.

5. The system of claim 3, wherein one of said security mechanisms includes second means for providing a unique session key to a requesting element in response to a network element access requests to access any resource or information in a selected element, wherein said requesting element and said selected element can be one of the user or network elements, and said unique session key is used by said local access control means associated with each of said requesting element and said selected element for encryption and decryption of communications between said requesting element and said selected element.

6. The system of claim 4, wherein said local access control means associated with each of said requesting element and said selected element uses integrity checksums to ensure integrity of data communicated between said requesting element and said selected element.

7. The system of claim 2, wherein
   the network includes at least one logical partition creating a plurality of realms, each of said plurality of realms includes its own network security server, and
   said network security servers associated with said plurality of realms include inter-realm authentication means for communication between said plurality of realms.

8. The system of claim 7, wherein said security servers associated with said plurality of realms share said registration database.

9. The system of claim 2, further comprising a dial-up server to permit dial-up users access to the network elements through the network, wherein said dial-up server supports a network communication protocol to connect the dial-up users to the network and a dial-up access protocol to connect the dial-up users to a dial-up access network.

10. A method for providing security of access to network elements by user elements and protect network resources and information, wherein the network and user elements are coupled to a network including a network security server, the method comprising the steps of:
   providing authentication of users to the network elements using an authentication server that prepares a response message associated with the network security server;
   managing network user credentials or privileges using a credential server associated with the authentication server;

controlling access to the network elements by the user elements using a network element access server associated with the authentication server and the credential server, wherein access to the network by the user is based upon verification of a combination of the credentials;

storing user identifiers, a list of user credentials, user passwords and administrative information in a registration database associated with the network security server, to facilitate administration and management of access to the network elements by the user elements; and providing a separate local access control means for each user element and each network element, wherein each local access control means operates in conjunction with the network security server to facilitate secure communication of data over the network.

11. The method of claim 10, further comprising the step of issuing a general ticket to each user element at log in, wherein said general ticket is used by the network security server for authentication of access requests by the user elements.

12. The method of claim 11, further comprising the step of:

providing a session ticket to a requesting element in response to a network element access request to access any resource or information in a selected element, wherein said requesting element and said selected element can be one of the user or network elements, and said session ticket includes information that has to be present for all communication between said requesting element and said selected element.

13. The method of claim 12, wherein said step of providing a session ticket is performed by the network security server.

14. The method of claim 11, further comprising the step of providing a unique session key to a requesting element in response to a network element access request to access any resource or information in a selected element, wherein said requesting element and said selected element can be one of the user or network elements.

15. The method of claim 14, further comprising the step of using said unique session key for encryption and decryption of communications between said requesting element and said selected element.

16. The method of claim 15, further comprising the step of performing said encryption and decryption using said local access control means associated with said requesting element and said selected element.

17. The method of claim 16, further comprising the step of using integrity checksums to ensure integrity of data communicated between said requesting element and said selected element.

18. The method of claim 16, further comprising the step of using integrity checksums to verify communications between said requesting element and said selected element.

19. The method of claim 11, further comprising the step of logically partitioning the network to create at least two separate realms, providing each realm with its own network security server and an inter-realm authentication means for communication with another of said at least two separate realms.

20. The method of claim 19, further comprising the step of permitting said at least two separate realms to share said registration database.

21. The method of claim 11, further comprising the step of:

including a dial-up server a dial-up server to permit dial-up users access to the network elements through the network, wherein said dial-up server supports a network communication protocol to connect the dial-up users to the network and a dial-up access protocol to connect the dial-up users to a dial-up access network.

* * * * *